(12) United States Patent
Dudar

(10) Patent No.: US 10,994,605 B2
(45) Date of Patent: May 4, 2021

(54) SYSTEMS AND METHODS FOR REDUCING VEHICLE EVAPORATIVE EMISSIONS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 16/116,566

(22) Filed: Aug. 29, 2018

(65) Prior Publication Data
US 2020/0070649 A1   Mar. 5, 2020

(51) Int. Cl.
*B60K 15/035* (2006.01)
*B60K 15/03* (2006.01)
*F02M 25/08* (2006.01)

(52) U.S. Cl.
CPC .. *B60K 15/03519* (2013.01); *B60K 15/03504* (2013.01); *B60K 2015/0321* (2013.01); *B60K 2015/0358* (2013.01); *B60K 2015/03203* (2013.01); *B60K 2015/03361* (2013.01); *B60K 2015/03514* (2013.01); *B60K 2015/03566* (2013.01); *F02M 25/0836* (2013.01)

(58) Field of Classification Search
None
See application file for complete search history.

(56) References Cited

U.S. PATENT DOCUMENTS

| 3,874,427 A | 4/1975 | Tiggelbeck |
| 7,055,556 B2 | 6/2006 | Benjey et al. |
| 7,243,678 B2 | 7/2007 | Banjeree et al. |
| 9,650,974 B2 | 5/2017 | Dudar |
| 9,732,706 B2 | 8/2017 | Dudar et al. |
| 10,598,134 B1 * | 3/2020 | Dudar .................. F02M 26/47 |
| 2003/0056837 A1 | 3/2003 | Benjey |
| 2013/0153050 A1 | 6/2013 | Teets et al. |
| 2020/0079330 A1 * | 3/2020 | Dudar .................. F02D 41/003 |

OTHER PUBLICATIONS

"Filld: Gas Delivered to Your Car," Filld Website, Available Online at https://filld.com/, Available as Early as Mar. 25, 2016, 11 pages.

* cited by examiner

*Primary Examiner* — Daphne M Barry
(74) *Attorney, Agent, or Firm* — Geoffrey Brumbaugh; McCoy Russell LLP

(57) ABSTRACT

Methods and systems are provided for reducing an amount of fuel vapors that are routed to a fuel vapor storage canister during a refueling event, in response to an indication that a fuel dispenser that is dispensing fuel to a fuel tank is underperforming. In one example, a method comprises increasing a pressure in the fuel tank responsive to an indication that the fuel dispenser is dispensing fuel at a first rate that is at least a threshold amount below a second rate, without changing the first rate at which the fuel dispenser is dispensing the fuel. In this way, fuel vapor recirculation may be improved and an amount of fuel vapors routed to the canister reduced, which may thus reduce opportunities for release of undesired evaporative emissions to atmosphere.

15 Claims, 10 Drawing Sheets

SYSTEMS AND METHODS FOR REDUCING VEHICLE EVAPORATIVE EMISSIONS

FIELD

The present description relates generally to methods and systems for controlling an onboard pump positioned in an evaporative emissions control system to assist in recirculation of fuel vapors during refueling events.

BACKGROUND/SUMMARY

Vehicle evaporative emissions control systems may be configured to store fuel vapors from fuel tank refueling and diurnal engine operations, and then purge the stored vapors during a subsequent engine operation. The fuel vapors may be stored in a fuel vapor canister coupled to the fuel tank which contains adsorbent material, such as activated carbon, capable of adsorbing hydrocarbon fuel vapor.

The fuel tank may be further coupled to a vapor recovery line, also referred to as a vapor recirculation line. The vapor recirculation line may be configured to circulate and/or hold a percentage of refueling vapors, thus limiting a rate of fuel vapor canister loading. Fuel vapors may recirculate back to the fuel tank by flowing through the vapor recirculation line, and then through a filler neck of the fuel tank. Further, depending on the fuel dispenser, the fuel vapors within the vapor recirculation line may be returned to the fuel dispenser, thus limiting the total fuel vapor stored within the fuel vapor canister for a given refueling event. Fuel vapor recirculation lines include orifices to regulate the fuel vapor flow rate through the recirculation line. Orifice size may thus determine a quantity of fuel vapors that get recirculated, as opposed to being routed to the canister.

However, such orifices in vapor recirculation lines may be sized in terms of an optimal or ideal dispense rate of fuel from a fuel dispenser. Thus, in a case where a fuel dispenser is underperforming or, in other words, delivering fuel at a dispense rate lower than that expected or desired, then fuel system pressure may not be great enough to effectively circulate refueling vapors through the recirculation line. As a result, canister loading with fuel vapors may increase, and a potential for release of undesired evaporative emissions to the environment may increase as well. Such an issue may be exacerbated with the adoption of on-demand gas delivery systems, where fuel dispensers are mounted on mobile platforms. Fuel dispensers used in such applications may have smaller pumps that may operate at lower voltages than dispensers at gas stations, for example. Thus, fuel dispense rates for such applications may regularly be lower than that desired or expected for particular vehicle fuel systems with restriction orifices positioned in the vapor recirculation lines.

The inventors have herein recognized the above-mentioned issues, and have developed systems and methods to at least partially address them. In one example, a method comprises increasing a pressure in a fuel tank of a vehicle in response to an indication that a fuel dispenser providing a fuel to the fuel tank during a refueling event is dispensing the fuel at a first rate that is at least a threshold amount below a second rate, without changing the first rate at which the fuel dispenser is dispensing the fuel. In this way, recirculation of fuel vapors generated during the refueling event may be improved, which may reduce loading of a fuel vapor storage canister coupled to the fuel tank.

As one example, increasing the pressure in the fuel tank may further comprise increasing the pressure in the fuel tank to a pressure amount corresponding to an expected pressure when the fuel dispenser is dispensing the fuel at the second rate. By increasing the pressure in the fuel tank, as discussed, the fuel vapor storage canister may be loaded to a lower amount as compared to not increasing the pressure in response to the indication of the fuel dispenser dispensing the fuel at the first rate.

In one example, increasing the pressure in the fuel tank may be via a pump. The pump may be selectively fluidically coupled to the vapor recirculation line that is coupled to the fuel tank and to the fuel filler system of the fuel tank. The pump may alternatively be selectively fluidically coupled to a vent line stemming from the fuel vapor storage canister, under conditions that do not include a refueling event where the fuel dispenser is underperforming. In this way, the same pump may be utilized on one hand to conduct an evaporative emissions test diagnostic procedure (when the pump is selectively fluidically coupled to the vent line), and may be utilized to increase the pressure in the fuel tank under other conditions that include a refueling event where a fuel dispenser is underperforming. Such an ability may enable an overall reduction in release of undesired evaporative emissions to the environment.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
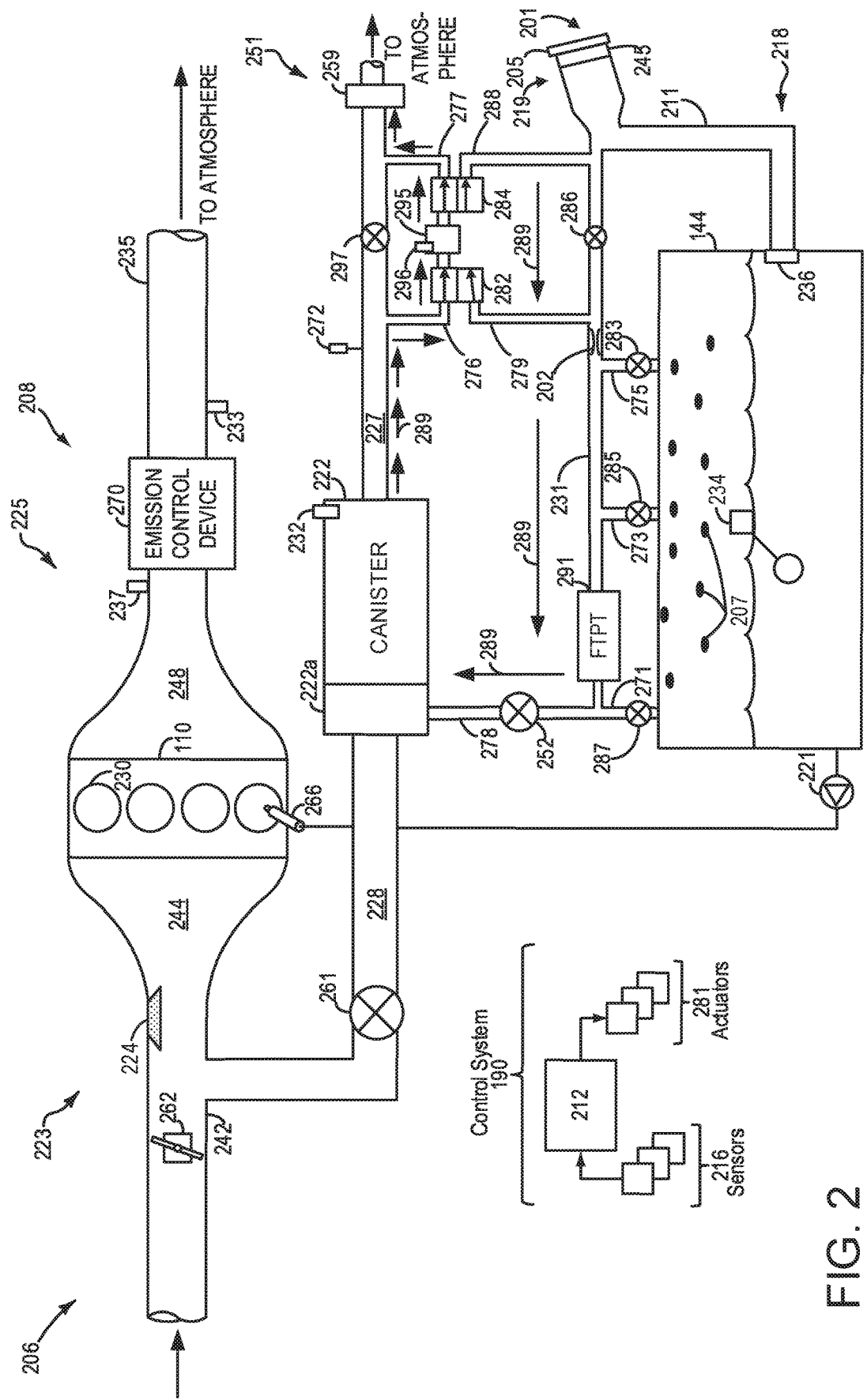
FIG. 2 schematically shows an example vehicle system with a fuel system and an evaporative emissions system, with an evaporative level check module (ELCM) that includes a pump fluidically coupled to a vent line and not to a vapor recirculation line.
Figure 3:
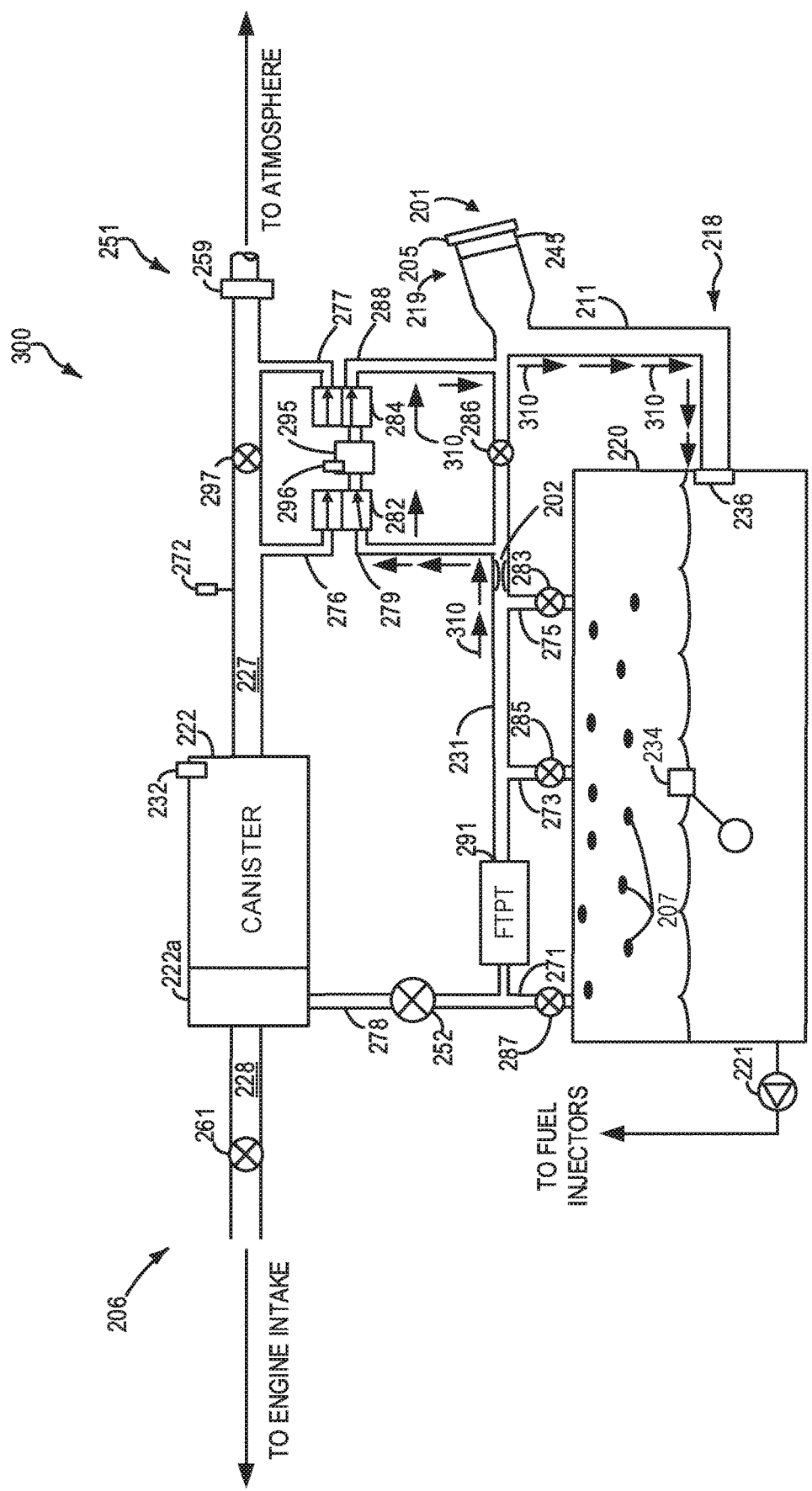
FIG. 3 schematically shows a portion of the example vehicle system of FIG. 2, with the ELCM fluidically coupled to the vapor recirculation line and not to the vent line.
Figure 4:
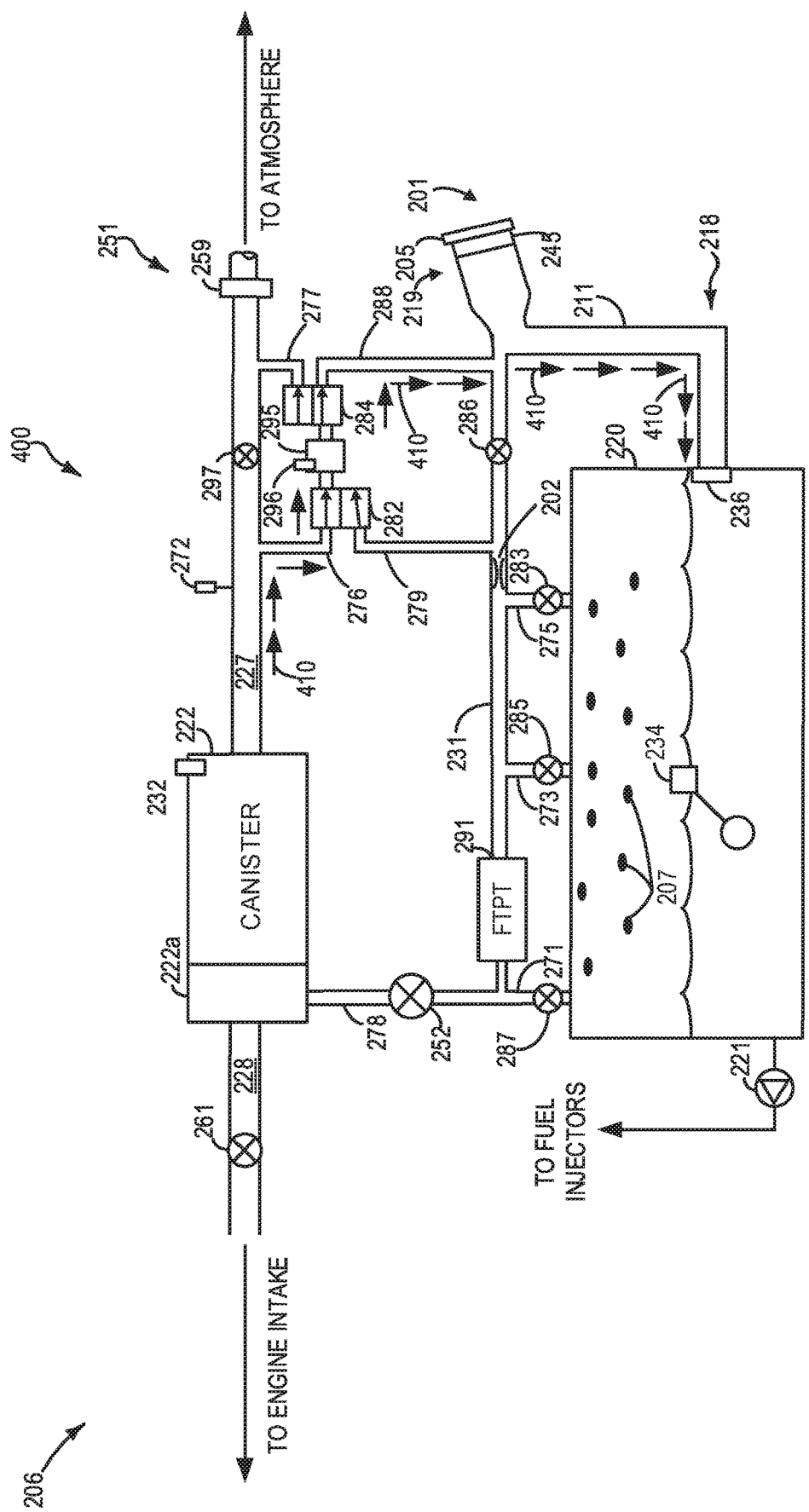
FIG. 4 schematically shows a portion of the example vehicle system of FIG. 2, with the ELCM fluidically coupled to both the vent line and to the vapor recirculation line.

The following description relates to systems and methods for reducing release of undesired evaporative emissions to atmosphere. More specifically, the following description relates to systems and methods for reducing an amount of fuel vapors that may be routed to a fuel vapor storage canister during a refueling event where a fuel dispenser is inferred to be dispensing fuel at a lower rate than an optimal rate, or in other words, a desired or expected rate. The systems and methods may be particularly relevant for hybrid vehicles, such as the hybrid vehicle system depicted at FIG. 1, as fuel vapor storage canisters in hybrid vehicles may be sized smaller than non-hybrid vehicles and thus preventing undesired loading of the canister may be particularly advantageous for hybrid vehicles. The systems and methods described herein may enable a pump to be selectively fluidically coupled to a vent line stemming from a fuel vapor storage canister under conditions where the pump is requested to be used to conduct an evaporative emissions test diagnostic. Alternatively, the pump may be selectively fluidically coupled to a vapor recirculation line that couples a fuel tank to a fuel filler system and which functions to recirculate fuel vapors generated during refueling back to the fuel tank. Accordingly, FIG. 2 depicts an engine system coupled to an evaporative emissions system which is further coupled to a fuel system, and which further depicts the pump fluidically coupled to the vent line. FIG. 3 depicts a portion of the system of FIG. 2, depicting the pump fluidically coupled to the vapor recirculation line. FIG. 4 depicts the portion of the system depicted at FIG. 3, depicting the pump fluidically coupled to both the vent line and to the vapor recirculation line. In the configuration depicted at FIG. 4, the pump may be used to return bleedthrough emissions present in the vent line back to the fuel tank.

Figure 5A:
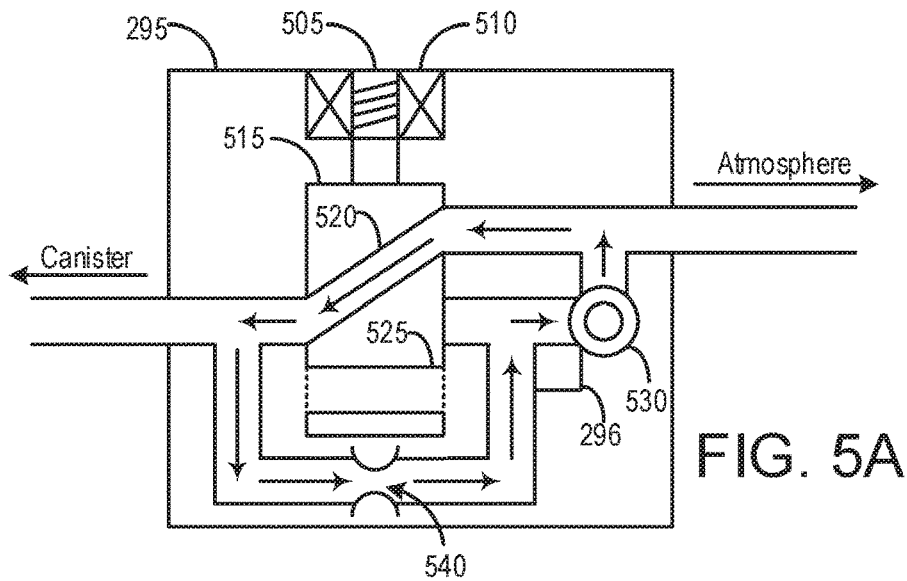
FIGS. 5A-5C schematically depict various operational states of the ELCM, relevant to the present disclosure.
Figure 5B:
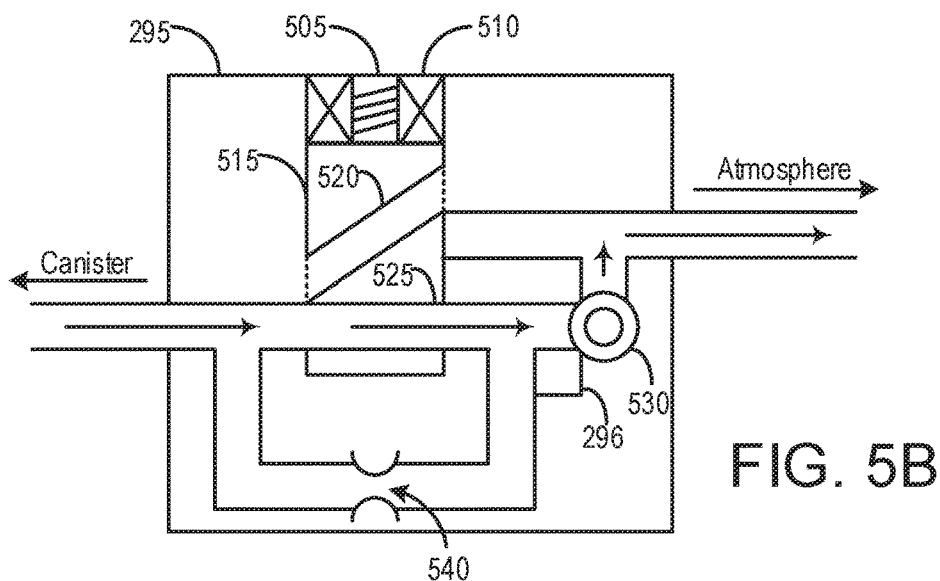
Figure 5C:
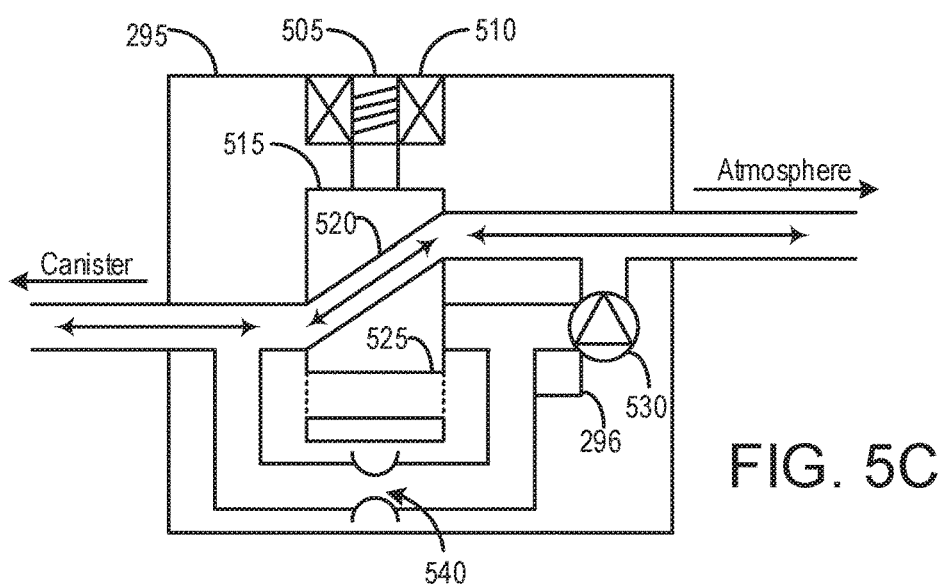
Figure 6:
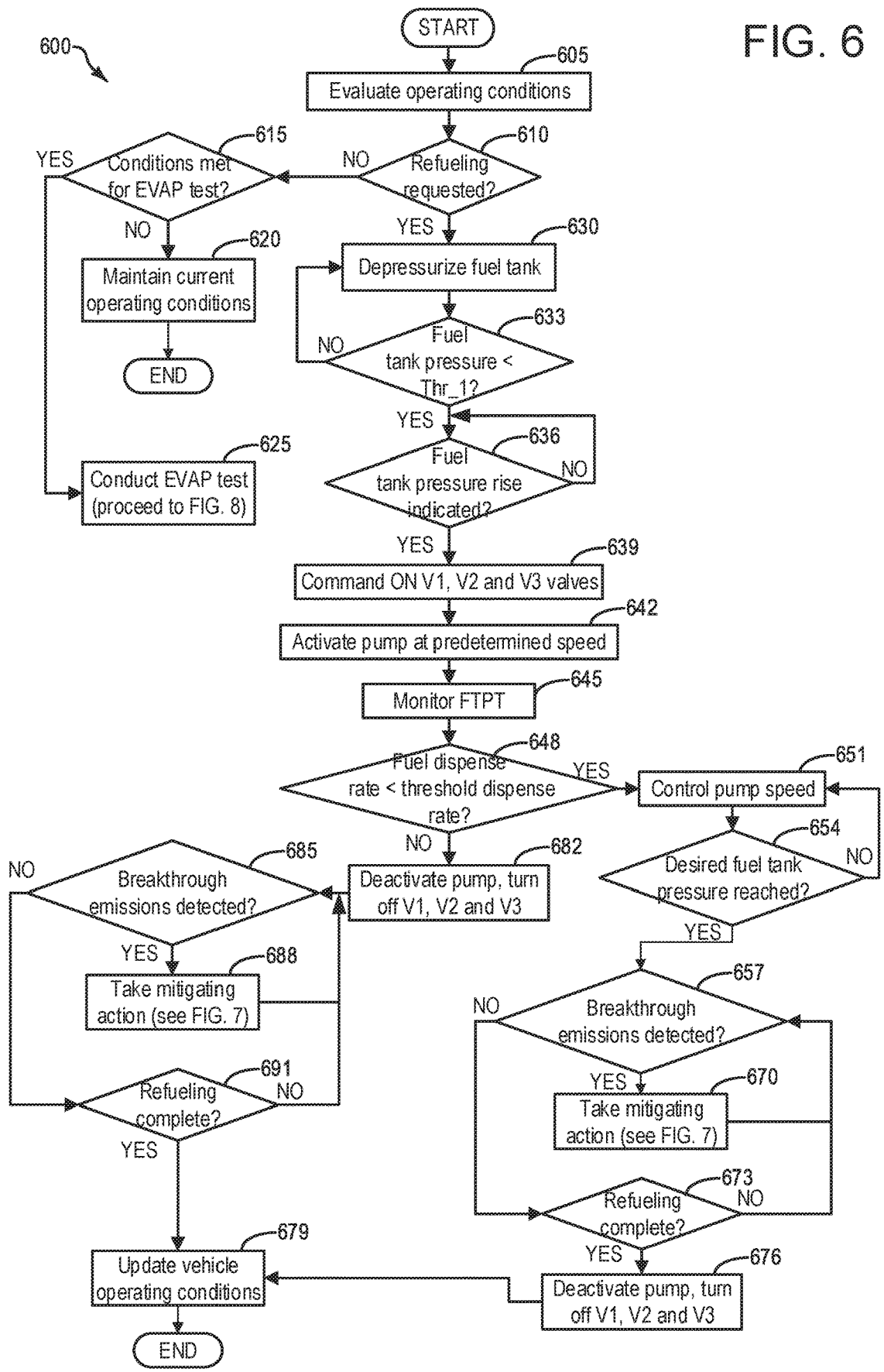
FIG. 6 illustrates a high-level example method for encouraging fuel vapor recirculation through the vapor recirculation line under refueling conditions where a fuel dispenser is underperforming.
Figure 7:
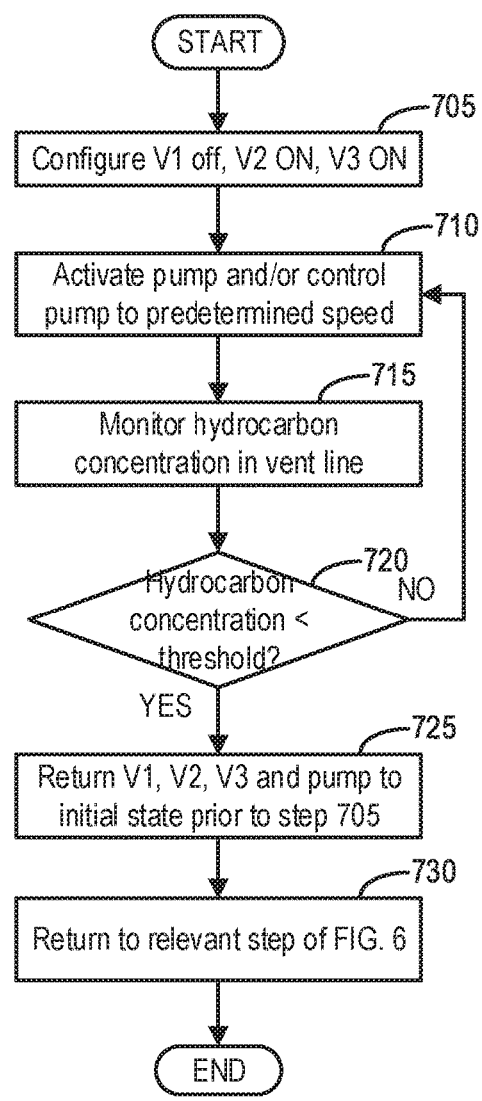
FIG. 7 illustrates a high-level example method for routing bleedthrough emissions stemming from a fuel vapor storage canister back to a fuel tank.
Figure 8:
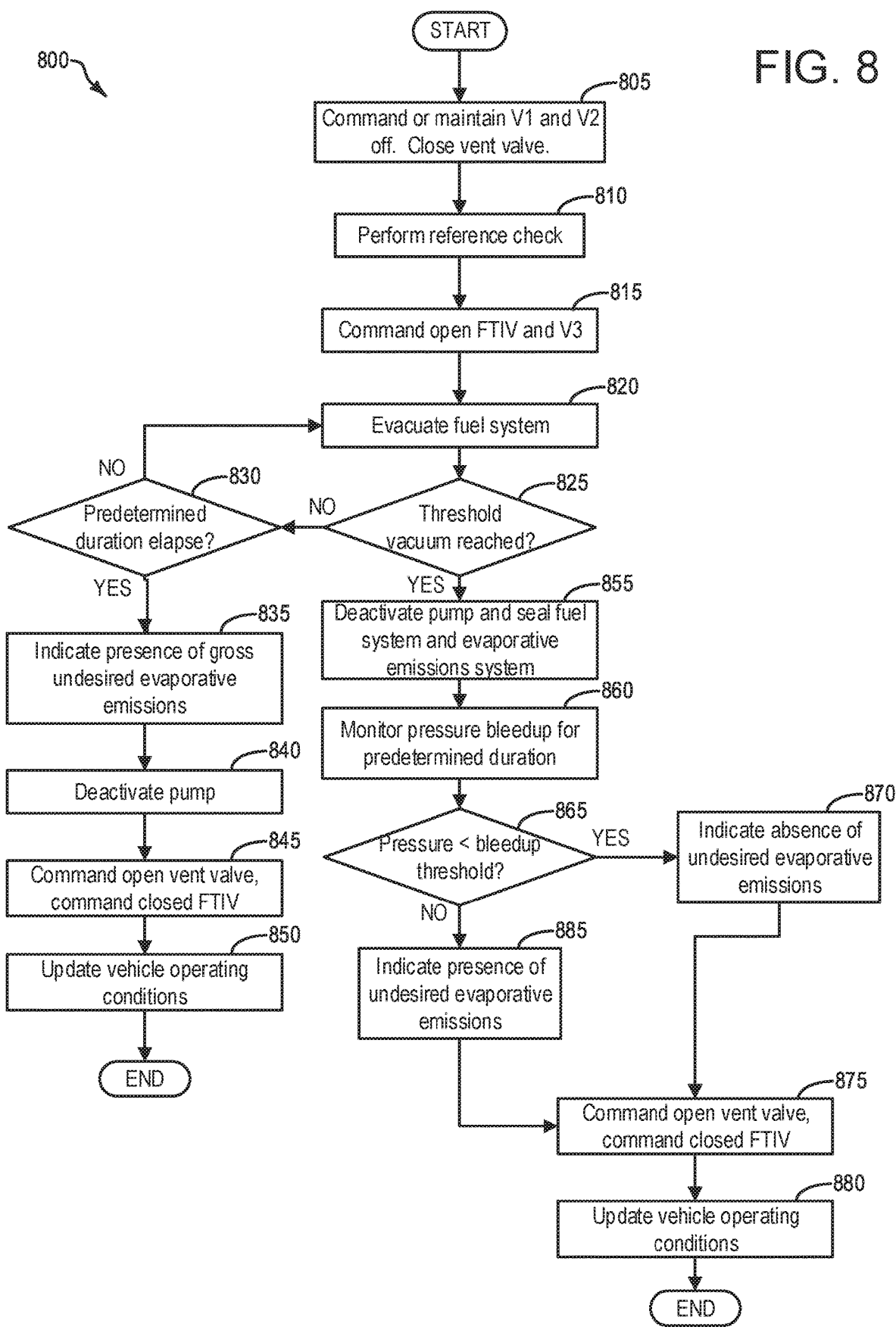
FIG. 8 illustrates a high-level example method for conducting an evaporative emissions test diagnostic procedure on the fuel system and evaporative emissions system configured as depicted at FIG. 2.
Figure 9:
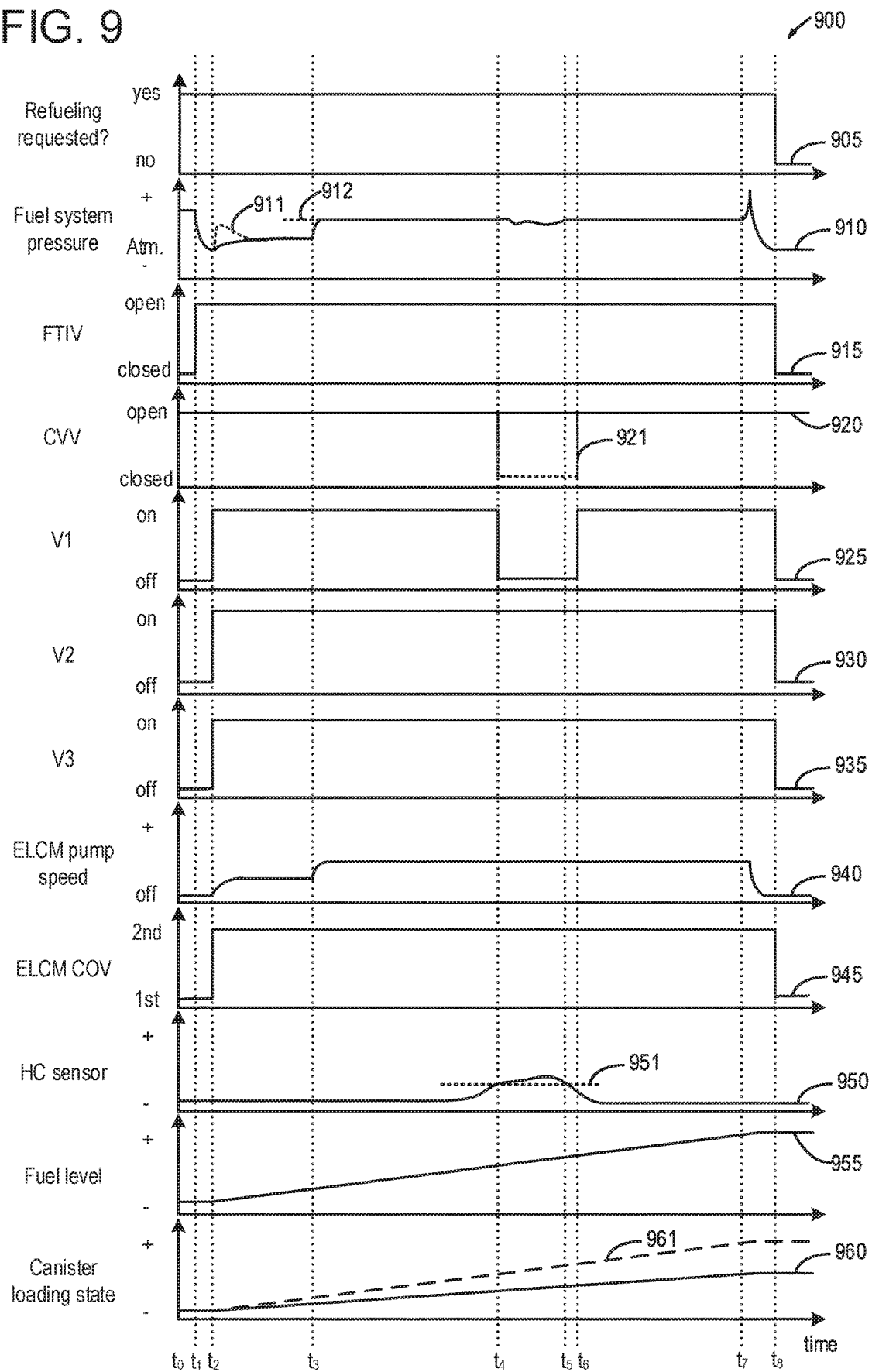
FIG. 9 depicts an example timeline for encouraging fuel vapor recirculation through the vapor recirculation line under conditions where a fuel dispenser is inferred to be underperforming, according to the methods of FIG. 6 and FIG. 7.
Figure 10:
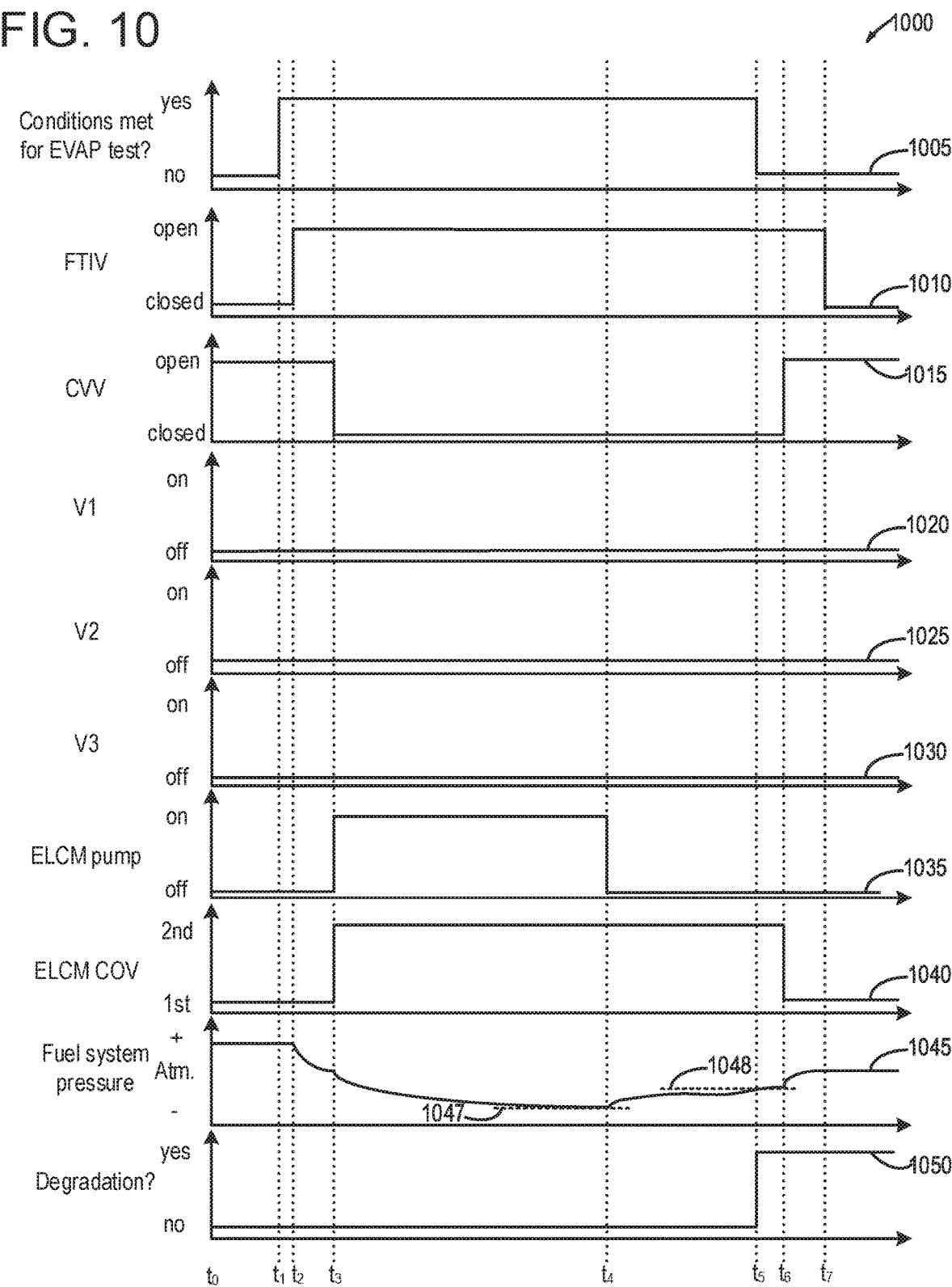
FIG. 10 depicts an example timeline for conducting an evaporative emissions test diagnostic according to the method of FIG. 8.

The pump discussed above may be part of an evaporative level check module (ELCM), and accordingly, various operational states of the ELCM are depicted at FIGS. 5A-5C. An example methodology for reducing an amount of fuel vapors that load the fuel vapor storage canister during a refueling event where it is inferred that a fuel dispenser dispensing fuel to the fuel tank is underperforming, is depicted at FIG. 6. FIG. 7 depicts an example methodology for using the pump to route bleedthrough emissions present in the vent line back to the fuel tank to avoid release of undesired evaporative emissions to atmosphere. FIG. 8 depicts an example methodology for using the pump to conduct an evaporative emissions test diagnostic procedure to assess a presence or an absence of undesired evaporative emissions stemming from the fuel system and/or evaporative emissions system. An example timeline depicting the use of the pump to increase pressure in the fuel system in response to an indication of an underperforming fuel dispenser, thus reducing an amount of loading of the canister, is illustrated at FIG. 9. An example timeline depicting the use of the pump to conduct the evaporative emissions test diagnostic procedure, is depicted at FIG. 10.

Figure 1:
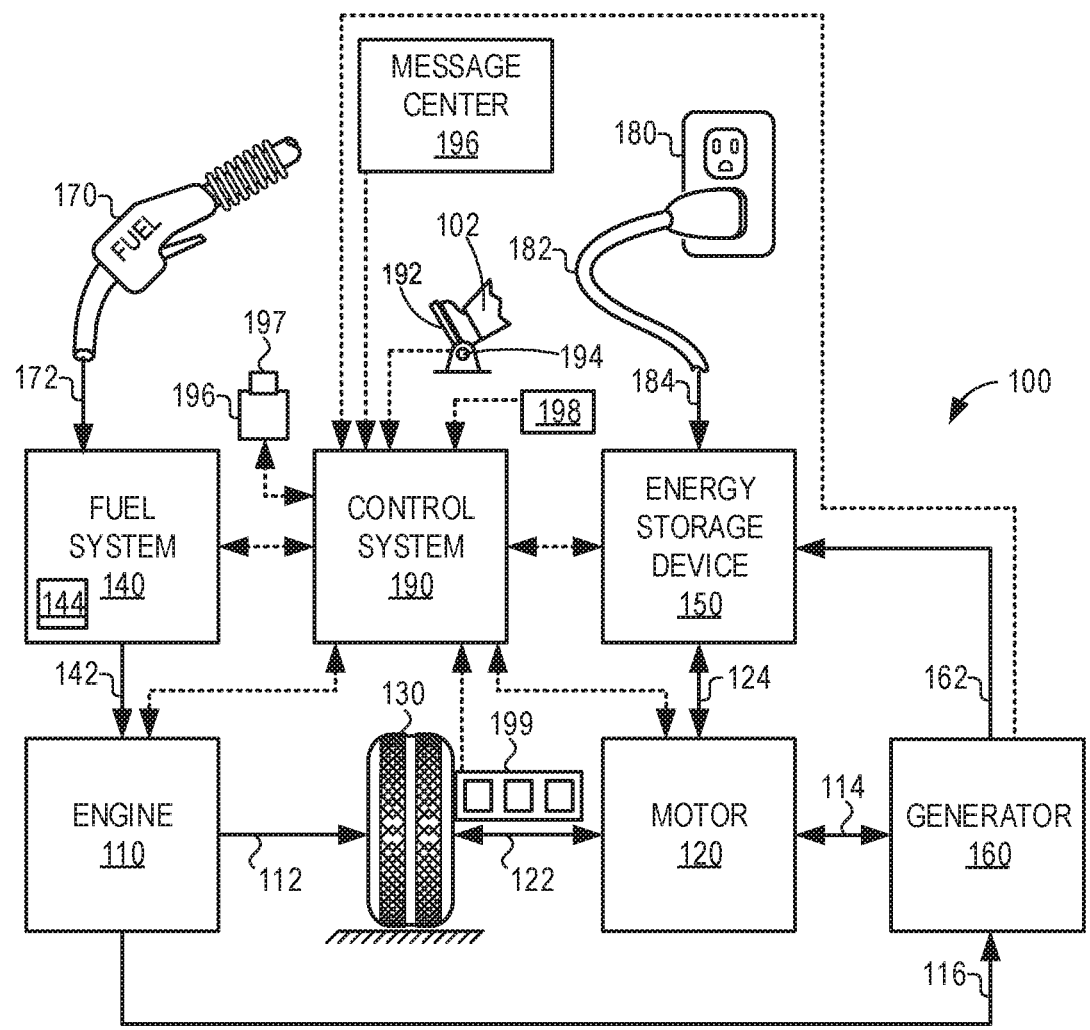
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198. Vehicle propulsion system 100 may also include inertial sensors 199. Inertial sensors 199 may comprise one or more of the following: longitudinal, latitudinal, vertical, yaw, roll, and pitch sensors. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206 (e.g. same as 100). The vehicle system 206 includes an engine system 208 coupled to an evaporative emissions control system 251 and a fuel system 218. Emission control system 251 includes a fuel vapor container or canister 222 which may be used to capture and store fuel vapors. In some examples, vehicle system 206 may be a hybrid electric vehicle system, as discussed above with regard to FIG. 1.

The engine system 208 may include engine 110 having a plurality of cylinders 230. The engine 110 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 110 to adsorb fuel vapors emanating from unburned fuel in the intake manifold, puddled fuel from one or more fuel injectors with undesired fuel outflow, and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors may be passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 110 is shut down.

Fuel system 218 may include a fuel tank 144 coupled to a fuel pump system 221. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 144 may hold a plurality of fuel blends, including fuel with a range of alcohol concentrations, such as various gasoline-ethanol blends, including E10, E85, gasoline, etc., and combinations thereof. A fuel level sensor 234 located in fuel tank 144 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to evaporative emissions control system 251 which includes a fuel vapor canister 222 via vapor recirculation line 231, before being purged to the engine intake 223. Vapor recirculation line 231 may be coupled to fuel tank 144 via one or more conduits and may include one or more valves for isolating the fuel tank during certain conditions. For example, vapor recirculation line 231 may be coupled to fuel tank 144 via one or more or a combination of conduits 271, 273, and 275.

Further, in some examples, one or more fuel tank vent valves may be configured in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, vapor recirculation line 231 may be coupled to a fuel filler system, for example fuel filler system 219. Vapor recirculation line 231 may be configured to circulate and/or hold a percentage of refueling vapors, thus limiting the rate of fuel vapor canister loading. Fuel vapors may recirculate back to the fuel tank by flowing through the vapor recirculation line 231, and then through a filler pipe or neck 211, depicted herein as coupled to fuel filler system 219. Furthermore, the vapor recirculation line may provide a path to the fuel filler neck in order to conduct diagnostic tests for undesired evaporative emissions from filler neck 211 and fuel filler system 219, particularly under conditions wherein the fuel level is above a fuel filler neck spud valve 236. Vapor recirculation line 231 may include a restriction orifice 202. Restriction orifice size (e.g. 2 mm-3.5 mm) may be selected as large enough to maximize vapor recirculation and thus minimize canister size, while additionally preventing hydrocarbon release to atmosphere via fuel fill inlet 201. Thus, efficient sizing of the orifice 202 may allow for reduced size of canister 222, thus saving on costs and weight while allowing the vehicle to comply with stringent emissions regulations.

For example, an optimal canister loading rate may comprise 4.7 grams of hydrocarbon (HC) per gallon of dispensed fuel for a particular canister size. If the vapor recirculation line were plugged or if the orifice size were too small (sized incorrectly), then the canister load may be higher (e.g. 6 grams HC/gallon of fuel dispensed) for the canister of the particular size. Thus, the vapor recirculation line may be configured to hold 20% of total HC during refueling events.

In another example, canister loading rates may be adversely impacted during refueling events if a gas station pump is underperforming. For example, there may be variability between different dispensing nozzles (e.g. 170), in a range of anywhere from 4-12 gallons per minute (GPM), depending on the particular pump. To be robust to such variability in fuel flow rates, orifices may be sized for a 10 GPM flow rate. Thus, if a particular fuel pump for dispensing fuel to fuel tank 144 is underperforming (e.g. 4 GPM flow rate), then pressure in the fuel system and vapor recirculation line may be too low to effectively circulate fuel vapors through the vapor recirculation line and back to the fuel tank. As a result, canister loading may increase, and furthermore, a potential for bleedthrough emissions from the canister during the refueling event may increase.

Such an example may occur for gas stations with older pumps, for example, which may thus underperform. However, on-demand fuel delivery where fuel is delivered to a vehicle via a truck that includes fuel that may be pumped from the truck to the fuel tank of the vehicle requesting the fuel delivery, may comprise another situation where fuel pump flow rate may be variable. For example, on-demand fuel delivery vehicle may have smaller pumps, with lower operating voltages (e.g. 12V) as compared to gas station pumps, and thus such flow rates may be lower than otherwise expected for gas station pumps. Again, low fuel flow rates may result in inadequate pressure build in the fuel system for effective vapor recirculation via the vapor recirculation line.

Accordingly, for situations where fuel flow rates from a dispensing nozzle are lower than expected or desired, it may be beneficial to actively increase fuel system pressure to encourage the vapor recirculation during the course of the refueling event. Actively increasing fuel system pressure may be accomplished via a pump configured to draw fuel vapors from the fuel tank into the vapor recirculation line 231, and to push the fuel vapors back to the fuel tank 144 via the fuel filler neck 211. However, incorporating a dedicated pump for such a function may increase weight, costs, reduce space, etc. Accordingly, as will be discussed in further detail below, a pump 295 configured to apply a positive or a negative pressure (with respect to atmospheric pressure) on the vehicle fuel system 218 and/or evaporative emissions system 251, may additionally be utilized for controlling fuel system pressure during refueling events.

During refueling events, fuel vapors 207 from fuel tank 144 may be directed through the recirculation line 231 on route to the fuel fill inlet 201. Fuel fill inlet 201 may be configured to receive fuel from a fuel source (e.g. dispensing nozzle 170). During a refueling event, the nozzle may be inserted into the fill inlet 201, and fuel may be dispensed into the fuel tank 144. Thus a refueling event comprises the dispensing of fuel from a fuel source into the fuel tank 144.

In some examples, fuel fill inlet 201 may include a fuel cap 205 for sealing off the fuel fill inlet 201 from the atmosphere. However, in other examples, the fuel fill inlet 201 may be a capless design and may not include a fuel cap 205. Fuel filler inlet 201 is coupled to fuel tank 144 via fuel filler pipe or neck 211. As such, fuel dispensed from the nozzle may flow through the filler neck 211 into the tank 144.

Fuel fill inlet 201 may further include refueling lock 245. In some embodiments, refueling lock 245 may be a fuel cap locking mechanism. The refueling lock 245 may be configured to automatically lock the fuel cap 205 in a closed position so that the fuel cap 205 cannot be opened. For example, the fuel cap 205 may remain locked via refueling lock 245 while pressure or vacuum in the fuel tank is greater than a threshold. In response to a refuel request, e.g., a vehicle operator initiated request, the fuel tank 144 may be depressurized and the fuel cap 205 unlocked after the pressure or vacuum in the fuel tank 144 falls below a predetermined pressure (e.g. within a threshold of atmospheric pressure). The refueling lock 245 may be a latch or clutch, which, when engaged, prevents the removal of the fuel cap 205. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of the dispensing nozzle into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and canister purge valve (CPV) 261. For example, CPV 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve may be a normally open valve, so that fuel tank isolation valve 252 (FTIV) may control venting of fuel tank 144 with the atmosphere. FTIV 252 may be positioned between the fuel tank and the fuel vapor canister within load conduit 278. FTIV 252 may be a normally closed valve, that when opened, allows for the venting of fuel vapors from fuel tank 144 to canister 222. Fuel vapors may then be vented to atmosphere, or purged to engine intake system 223 via CPV 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing CPV 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining CPV 261 closed, to depressurize the fuel tank before allowing enabling fuel to be added therein. As such, FTIV 252 may be kept open during the refueling operation to allow refueling vapors to be stored in the canister. After refueling is completed, the FTIV may be closed.

As yet another example, the fuel system may be operated in a canister purging mode (e.g., after an emission control device light-off temperature has been attained and with the engine running), wherein the controller 212 may open CPV 261 while closing FTIV 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

In still another example, the controller 212 may open CPV 261 and CVV 297 while opening isolation valve 252 so that fuel vapors from fuel tank 144, in addition to desorbed fuel vapors from canister 222, are both purged into the engine air intake to be combusted in the engine.

Controller 212 may comprise a portion of a control system 190. Control system 190 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 232. Exhaust gas sensor 237 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Other sensors such as pressure, temperature, and composition sensors may be coupled to various locations in the vehicle system 206. As another example, the actuators may include fuel injector 266, throttle 262, FTIV 252, ELCM 295, and in some examples, refueling lock 245. The controller 212 may receive input data from the various sensors, process the input data, and trigger the actuators in response to the processed input data based on instruction or code programmed therein corresponding to one or more routines. Example control routines are described herein with regard to FIGS. 6-8.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Evaporative emissions detection routines may be intermittently performed by controller 212 on fuel system 218 and/or evaporative emissions system 251 to confirm that an undesired amount of evaporative emissions are not being released from a source stemming from the fuel system and/or evaporative emissions control system. As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some examples, evaporative emissions tests may be performed by an evaporative level check module (ELCM) 295 which comprises a pump communicatively coupled to controller 212, the ELCM 295 further comprising a pressure sensor 296.

As discussed above, it may be desirable to utilize ELCM 295 for conducting evaporative emissions tests, as well as to encourage fuel vapor flow through recirculation line 231 during refueling events when a gas station pump or other pump (e.g. on-demand fuel delivery pump) has a flow rate lower than expected or desired, which may lead to an increase in fuel vapors routed to the canister 222.

Accordingly, ELCM 295 is depicted at FIG. 2 as being selectively fluidically coupled to vent line 227 via a first conduit 276 that couples to vent line 227 at a position downstream of canister vent valve (CVV) 297 (between CVV 297 and canister 222), and via a second conduit 277 that couples to vent line 227 at a position upstream of CVV 297 (between CVV 297 and atmosphere). As depicted, a first valve 282 (V1) may control the fluidic coupling of the ELCM 295 to vent line 227 via first conduit 276, and a second valve 284 (V2) may control the fluidic coupling of the ELCM 295 to vent line 227 via second conduit 277.

ELCM is further depicted at FIG. 2 as having an option to be selectively fluidically coupled to vapor recirculation line 231 at a position downstream of a third valve 286 (V3) (e.g. between V3 286 and restriction orifice 202) via a third conduit 279, and selectively fluidically coupled to vapor recirculation line 231 at a position upstream of V3 286 (e.g. between V3 286 and fuel filler neck 211) via a fourth conduit 288.

When valves V1 282 and V2 284 are OFF, it may be understood that ELCM 295 may be coupled to the vent line 227 via first conduit 276 and second conduit 277, and not fluidically coupled to vapor recirculation line 231. Alternatively (see FIG. 3), when valves 282 and 284 are ON, it may be understood that ELCM 295 may be coupled to the vapor recirculation line 231 via third conduit 279 and fourth conduit 288, and not fluidically coupled to vent line 227. In yet another example (see FIG. 4), ELCM may be fluidically coupled to vent line 227 at a position downstream of CVV 297 and fluidically coupled to vapor recirculation line at a position upstream of V3 286, when V1 is OFF but where V2 is ON.

It may thus be understood that V1 282, V2 284 and V3 286 may comprise solenoid actuatable valves, in which a solenoid (not shown for each valve) uses an electric current to generate a magnetic field and thereby operate a mechanism which regulates the opening/closing of fluid flow in the valves. When V1, V2 and/or V3 are OFF, it may thus be understood that no current is being supplied to the valve. In such a case where no current is supplied to V3 and thus V3 is "OFF", it may be understood that V3 is open, whereas when current is supplied to V3 and thus V3 is "ON", it may be understood that V3 may close.

ELCM 295 may include a vacuum pump for applying negative pressure to the fuel system when administering an evaporative emissions test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. For example, a pump in the module may evacuate a small volume of air from the emission control system through a reference orifice in the module to obtain a reference pressure. The pump may then be operated to generate decreasing pressure in the emission control system which may be monitored by a controller and undesired evaporative emissions may be indicated in response to the pressure in the emission control system remaining above an adjusted reference pressure, where the adjusted reference pressure is based on an actual size or diameter of the reference orifice in the ELCM.

As described above, entire evaporative emissions control systems and fuel systems need to be intermittently diagnosed for the presence of undesired evaporative emissions. Accordingly, for conducting an evaporative emissions test diagnostic via use of the ELCM to ascertain a presence or an absence of undesired evaporative emissions stemming from the fuel system and/or evaporative emissions system, the following strategy may be employed. Valves V1, V2 and V3 may be commanded or maintained OFF. CVV 297 may be commanded or maintained closed. The FTIV 252 may be commanded open, and the CPV 261 may be maintained closed. The ELCM 295 may be commanded to draw a negative pressure with respect to atmospheric pressure on the fuel system and evaporative emissions system. At FIG. 2, bold arrows 289 depict the pathway whereby the fuel system and evaporative emissions may be evacuated when ELCM 295 is activated to apply a vacuum on the fuel system and evaporative emissions system, when V1, V2 and V3 are all commanded or maintained OFF. As will be discussed in further detail below, upon a threshold vacuum being reached in the fuel system and evaporative emissions system, the ELCM may be turned off in order to seal the fuel system and evaporative emissions system from atmosphere, and pressure bleedup may be monitored. If the pressure bleedup remains below a pressure bleedup threshold and/or if a pressure bleedup rate remains below a pressure bleedup rate threshold, an absence of a source of undesired evaporative emissions may be indicated.

As discussed, CVV 297 may be coupled within vent line 227. CVV 297 may function to adjust a flow of air and vapors between canister 222 and the atmosphere, and as mentioned, may be used for diagnostic routines. For example, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the CVV may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

As discussed above, there may be circumstances which lead to bleed through of hydrocarbons from canister 222 to atmosphere via vent line 227. Accordingly, a hydrocarbon sensor 272 may be positioned upstream of canister 222, and may report on whether bleed through of hydrocarbons from canister 222 is indicated. As will be discussed in detail below, in a case where bleed through of hydrocarbons is indicated, mitigating action may be taken to return bleed through vapors to the fuel tank (see FIG. 4 for example).

As discussed above when a fuel pump (e.g. gas station pump or pump associated with an on-demand service) is underperforming, it may be desirable to increase fuel system pressure to encourage fuel vapor recirculation through vapor recirculation line. Accordingly, turning to FIG. 3, an illustration 300 is depicted, illustrating a portion of vehicle system 206. Components that are the same between FIG. 2 and FIG. 3 are depicted as the same numerals. The portion of vehicle system 206 that is depicted at FIG. 3 includes the fuel system 218 and the evaporative emissions system 251.

In order to increase pressure in the fuel system to encourage vapor recirculation via vapor recirculation line 231, valves V1 282, V2 284 and V3 286 may be commanded ON. In other words, V1 282 and V2 284 may thus be configured to fluidically couple the ELCM 295 to the vapor recirculation line 231, and not to the vent line 227. By commanding ON V3 286, it may be understood that V3 is commanded closed. In this way, during a refueling event, the ELCM 295 may be commanded on to route fuel vapors through the vapor recirculation line 231, and to push fuel vapors back to the fuel tank, in the direction of bold arrows 310. It may be understood that in order to allow for some amount of fuel vapors to additionally be routed to the canister while the refueling event is in progress, CVV 297 may be commanded or maintained fully open.

Furthermore, as mentioned above, there may be circumstances where bleed through emissions from canister 222 may occur. In one example, such bleed emissions may be during a refueling event, where vapors are pushed from the canister into vent line 227 due to pressure in the fuel system and/or due to overloading of the canister. In another example, such bleed emissions may result from the vehicle being parked in a hot climate where fuel vapors adsorbed onto the adsorbent material of canister 222 may migrate in the direction of atmosphere and away from the canister. In such a case, mitigating action may be taken to return fuel vapors that have migrated into vent line 227 back to fuel tank 220. Accordingly, turning to FIG. 4, an example illustration 400 is depicted, illustrating a portion of vehicle system 206. As per FIG. 3, the portion illustrated at FIG. 4 comprises the fuel system 218 and the evaporative emissions system 251. Components of vehicle system 206 that are the same as those depicted at FIG. 2, are depicted as the same numerals at FIG. 4.

In response to an indication of an amount of hydrocarbons (HCs) in the vent line greater than a threshold HC concentration, as monitored via for example HC sensor 272, controller 212 may command or maintain V1 OFF, and V2 ON, while additionally commanding V3 ON (closed). CVV 297 may be commanded or maintained closed, or in some examples, may be commanded or maintained open. By commanding V1 OFF, ELCM 295 may be fluidically coupled to the vent line at the position between CVV 297 and canister 222. By commanding V2 ON, ELCM 295 may be fluidically coupled to vapor recirculation line 231 at a position between V3 286 and fuel filler neck 211. With V3 closed, the ELCM pump may be activated to draw a vacuum on the vent line, which may pull any bleed through emissions in the direction of bold arrows 410, which may return the fuel vapors to the tank, thus reducing an opportunity for the bleedthrough emissions to be released to atmosphere.

As discussed above with regard to FIGS. 2-4, the ELCM 295 may be used to apply a vacuum on the fuel system and/or evaporative emissions system for the above-mentioned reasons. ELCM 295 may be equipped with a changeover valve (COV), which may enable various operational states of ELCM 295.

Turning now to FIGS. 5A-5C, they show a schematic depiction of an example ELCM 295 in various conditions in accordance with the present disclosure. As shown in FIGS. 2-4, ELCM 295 may be selectively fluidically coupled to the vent line (e.g. 227) or to the vapor recirculation line (e.g. 231). For each of FIGS. 5A-5C, it may be understood that for illustrative purposes, the ELCM is selectively fluidically coupled to the vent line, thus coupling the ELCM to the canister and to atmosphere via vent line 227. In other words, the ELCM is coupled to the vent line as depicted at FIG. 2.

ELCM 295 includes a changeover valve (COV) 515, a pump 530, and pressure sensor 296. Pump 530 may be a vane pump, however other pump configurations have additionally been contemplated. The COV may be moveable between a first a second position. In the first position, as shown in FIGS. 5A and 5C, fluid may flow through the ELCM via first flow path 520. In the second position, as shown in FIG. 5B, air may flow through the ELCM via second flow path 525. The position of the COV may be controlled by solenoid 510 via compression spring 505. The ELCM may also comprise reference orifice 540. The reference orifice may have a diameter corresponding to the size of a threshold leak to be tested, for example, 0.02-0.09". In either the first or second position, pressure sensor 296 may generate a pressure signal reflecting the pressure within the ELCM. Operation of the COV and solenoid may be controlled via signals received from controller 212 (see FIG. 2).

As shown in FIG. 5A, the COV 515 is in the first position, and the pump 530 is activated. Air flow through the ELCM in this configuration is represented by arrows. In this configuration, the pump may draw a vacuum on the reference orifice, and the pressure sensor may record the vacuum level within the ELCM. This reference check vacuum level reading may then become the threshold for passing/failing a subsequent evaporative emissions test diagnostic.

As shown in FIG. 5B, COV 515 is in the second position, and pump 530 is activated. The pump 530 thus draws a vacuum on the canister, and fluid flow is represented by arrows. In this configuration, the pump pulls a vacuum on at least the evaporative emissions control system (e.g. 251) and in some examples the fuel system (e.g. 218) as well, as described above with regard to FIG. 2 and FIG. 4.

As shown in FIG. 5C, COV 515 is in the first position, and pump 530 is de-activated. In such a configuration, fluid may freely flow between atmosphere and the canister, as depicted by double-sided arrows. In such a configuration, a canister purging operation may be conducted wherein canister purge valve (e.g. 261) is open and intake manifold vacuum may draw air through the ELCM and fuel vapor canister (e.g., 222), thus resulting in desorption of fuel vapors to engine intake for combustion. In a case such as that depicted at FIG. 2 where a CVV (e.g. 297) is additionally included, the CVV may be commanded or maintained open for purging, or may be commanded closed provided sufficient air may flow through the ELCM fluidically coupled to the vent line and further fluidically coupled to atmosphere (e.g. COV in the first position, and the ELCM fluidically coupled to the vent line as per FIG. 2). In another example, for purging the canister, the ELCM may be configured with the COV in the second position (FIG. 5B) with pump 530 off, where the CVV (e.g. 297) may be commanded fully open.

Thus, the systems described above with reference to FIGS. 1-5C may enable a system for a vehicle comprising a pump that is selectively fluidically coupled to a vent line stemming from a fuel vapor storage canister in an evaporative emissions system when a first valve and a second valve are in an OFF state, and that is selectively fluidically coupled to a vapor recirculation line that couples a fuel tank to a fuel filler system when the first valve and the second valve are in an ON state. Such a system may further include a controller with computer readable instructions stored on non-transitory memory that when executed during a refueling event of the fuel tank, cause the controller to indicate a fuel dispenser that is dispensing fuel to the fuel tank is dispensing fuel at a rate lower than a desired rate. The controller may store further instructions to command the first valve and the second valve to the ON state to selectively fluidically couple the pump to the vapor recirculation line. The controller may store further instructions to operate the pump to increase a pressure in the fuel tank to a pressure level that is expected in response to the fuel dispenser dispensing fuel at the desired rate.

As an example of such a system, the system may further comprise a restriction orifice positioned in the vapor recirculation line, where the desired rate is a function of a sizing of the restriction orifice. Such a system may further comprise a third valve positioned in the vapor recirculation line between the restriction orifice and the fuel filler system, and further between two points where the pump is selectively fluidically coupled to the vapor recirculation line. The controller may store further instructions to command closed the third valve for increasing the pressure in the fuel tank.

As another example of such a system, the controller may store further instructions to, in response to an indication that the refueling event is not requested and further responsive to an indication that conditions are met for conducting an evaporative emissions test diagnostic to determine a presence or an absence of degradation stemming from a fuel system that includes the fuel tank and/or the evaporative emissions system, command the first valve and the second valve to the OFF state, command the third valve open, and operate the pump to evacuate the fuel system and the evaporative emissions system in order to conduct the evaporative emissions test diagnostic.

In still another example of such a system, the system may further comprise a hydrocarbon sensor positioned in the vent line. The controller may store further instructions to, in response to an indication of a concentration of hydrocarbons in the vent line greater than a threshold concentration, command the first valve to the OFF state, command the second valve to the ON state and command the third valve to the closed state. The controller may store further instructions to operate the pump to route the hydrocarbons in the vent line back to the fuel tank until the concentration of hydrocarbons in the vent line is lower than the threshold concentration.

Turning now to FIG. 6, a high level example method 600 for encouraging fuel vapor flow through a vapor recirculation line (e.g. 231) during a refueling event, is shown. More specifically, method 600 may be used in order to identify when a pump that is dispensing fuel to a fuel tank (e.g. 144) has a flow rate that is inferred to be lower than desired or expected, and in response, increasing fuel system pressure to a level that encourages further fuel vapor recirculation via the vapor recirculation line. In this way, loading of a canister (e.g. 222) with fuel vapors may be reduced under such circumstances, which may further prevent potential release of undesired evaporative emissions to the environment.

Method 600 will be described with reference to the systems described herein and shown in FIGS. 1-5C, though it should be understood that similar methods may be applied to other systems without departing from the scope of this disclosure. Method 600 may be carried out by a controller, such as controller 212 in FIG. 2, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIGS. 1-5C. The controller may employ actuators such as FTIV (e.g. 252), V1 (e.g. 282), V2 (e.g. 284), V3 (e.g. 286), CVV (e.g. 297), ELCM pump (e.g. 530), ELCM COV (e.g. 515), etc., to alter states of devices in the physical world according to the method depicted below.

Method 600 begins at 605, and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 610, method 600 may include indicating whether refueling is requested. As an example, a request for refueling may be initiated via a vehicle operator via the operator pressing a refueling button (e.g. 197), unlocking a fuel door, etc. If refueling is not requested at 610, method 600 may proceed to 615. At 615, method 600 may include indicating whether conditions are met for conducting an evaporative emissions test diagnostic (also referred to herein as EVAP test). Conditions being met for conducting an EVAP test may include one or more of the following. Conditions being met may include a threshold amount of time elapsing since a prior EVAP test was conducted. Conditions being met may include an engine-on condition where the vehicle is traveling at a substantially constant speed and otherwise steady-state conditions (e.g. absence of fuel slosh in the fuel tank, etc.). In some examples, conditions being met may include an engine-off condition, such as where a vehicle controller is woken up at a predetermined time after being slept, to conduct the EVAP test. Conditions being met may include an absence of a source of undesired evaporative emissions already determined to be present in the fuel system and/or evaporative emissions system. Conditions being met at 615 may in some examples include a request to conduct the EVAP test via use of the ELCM pump to evacuate the fuel system and/or evaporative emissions system.

If, at 615, conditions are met for conducing the EVAP test, method 600 may proceed to 625, where the EVAP test may be conducted according to the method depicted at FIG. 8. Alternatively, if conditions are not indicated to be met for conducting the EVAP test, method 600 may proceed to 620. At 620, method 600 may include maintaining current vehicle operating conditions. For example, if the vehicle is being propelled via the engine, via the motor, or some combination of the two, then such operating conditions may continue. Method 600 may then end.

Returning to 610, if it is indicated that refueling is requested, then method 600 may proceed to 630. At 630, method 600 may include depressurizing the fuel system prior to enabling fuel to be added thereto. Depressurizing the fuel tank may include commanding open the FTIV (e.g. 252). Depressurizing the fuel tank may further include commanding open or maintaining open the CVV (e.g. 297). Valves V1 (e.g. 282) and V2 may be commanded or maintained OFF, and the ELCM COV (e.g. 515) may be configured in the first position (see FIG. 5C), with the pump (e.g. 530) OFF. In this way, the fuel system may be fluidically coupled to atmosphere via the open CVV and/or via the ELCM pump fluidically coupled to atmosphere.

With the FTIV commanded open and the fuel system fluidically coupled to atmosphere, method 600 may proceed to 633. At 633, method 600 may include indicating whether pressure in the fuel system is less than a first threshold pressure. The first threshold pressure may comprise a pressure within a threshold of atmospheric pressure. If, at 633, the fuel system pressure has not dropped to below the first threshold, method 600 may continue to depressurize the fuel system. Alternatively, responsive to pressure in the fuel system decaying to below the first threshold pressure, method 600 may proceed to 636. It may be understood that responsive to the fuel system being depressurized, refueling may be enabled, for example via a fuel cap (e.g. 205) being correspondingly unlocked. Fuel system pressure may be monitored via, for example, a fuel tank pressure transducer (FTPT) (e.g. 291).

Responsive to the fuel system being enabled to receive fuel, at 636, method 600 may include indicating whether a pressure rise in the fuel system is indicated. Such pressure may be indicated via the FTPT, for example. In response to the first indication (however small) of a pressure rise indicating that fuel is being added to the tank, method 600 may proceed to 639, where V1 (e.g. 282), V2 (e.g. 284) and V3 (e.g. 286) are all commanded ON. In other words, at 639, method 600 may include fluidically coupling the ELCM to the vapor recirculation line (e.g. 231) and not to the vent line (e.g. 227). The CVV may be maintained open.

With the ELCM fluidically coupled to the vapor recirculation line, method 600 may proceed to 642, where the ELCM COV may be commanded to the second position (see FIG. 5B), and the ELCM pump may be activated at the predetermined speed. The ELCM pump may be activated such that fluid flow in the fuel system is in the direction depicted by bold arrows (e.g. 310) at FIG. 3. It may be understood that activating the pump at the predetermined speed may reduce an initial pressure spike that may occur upon refueling events prior to the vapor generated being routed through the vapor recirculation line. In other words, the ELCM pump may be activated at the predetermined speed such that vapor generation may be reduced (e.g. canister loading reduced), and potential for pre-mature shut-offs of the particular refueling dispenser may additionally be reduced. The predetermined speed may comprise a speed expected or inferred to reduce the initial pressure spike, while avoiding pushing fuel vapor to atmosphere via the fuel filler inlet (e.g. 201). Thus, it may be understood that activating the ELCM pump may be activated at the predetermined speed regardless of whether the pump dispensing fuel to the fuel tank is underperforming or not.

With the pump activated at the predetermined speed, as discussed, the initial pressure spike due to the addition of fuel to the fuel tank may be reduced or avoided altogether. Subsequently, pressure in the fuel system may again be monitored at 645. By monitoring the fuel system pressure, it may be inferred as to whether a dispense rate of fuel provided via the fuel dispenser is below a threshold fuel dispense rate. If it is determined that the dispense rate is below the threshold fuel dispense rate, then it may be inferred that the fuel dispenser is underperforming, or in other words, is performing at a level lower than that desired or expected given the restriction orifice (e.g. 202) size in the vapor recirculation line (e.g. 231). The threshold fuel dispense rate may comprise a dispense rate that is at least a threshold below an optimal or expected/desired dispense rate, where the optimal or expected/desired rate is a function of the restriction orifice (e.g. 202) present in the particular vapor recirculation line (e.g. 231).

In determining fuel dispense rate, it may be understood that fuel dispense rate may be a function of pressure in the fuel system (e.g. fuel tank pressure) minus any pressure contributed via the operation of the ELCM pump. Thus for example, if the ELCM pump at the predetermined speed is known to induce a 0.1 InH2O pressure in the fuel system, and the overall pressure in the fuel system is 0.6 InH2O, then it may be determined that the fuel system pressure contributed via the dispensing pump is 0.5 InH2O pressure. This may comprise a pressure corresponding to a dispense rate of approximately 4 GPM, which may be below the threshold fuel dispense rate. Alternatively, for illustrative purposes, a fuel system pressure of 2.2 InH2O (corrected for any fuel system pressure due to the ELCM pump) may correspond to 10 GPM, which may comprise a pressure that is not below the threshold fuel dispense rate. It may be understood that the fuel dispense rate may be below the threshold fuel dispense rate if the fuel dispense rate is lower than the optimal dispense rate by more than a threshold. As examples, fuel dispense rate may be below the threshold fuel dispense rate if the fuel dispense rate is more than 1 GPM below the optimal rate, more than 2 GPM below the optimal rate, more than 3 GPM below the optimal rate, more than 4 GPM below the optimal rate, etc. In this example description, it may be understood that the optimal fuel dispense rate for the given fuel system given the sizing of the restriction orifice (e.g. 202) is 10 GPM. Thus, it may be understood that it may be desirable to increase fuel system pressure in response to fuel system pressure being 9 GPM or below, 8 GPM or below, 7 GPM or below, 6 GPM or below, etc. It may be further understood that the lower the fuel dispense rate, the greater the amount by which the fuel system pressure may be raised.

Accordingly, at 648, if the fuel dispense rate is determined to be lower than the threshold fuel dispense rate, method 600 may proceed to 651. At 651, method 600 may include controlling pump speed in accordance with a difference between the determined fuel system pressure, and a desired fuel system pressure, the desired fuel system pressure corresponding to a desired fuel flow rate from the dispenser. For example, if the dispense rate is determined to be 6 GPM, and it is desired a fuel dispense rate of 10 GPM, then an amount of pressure that would correspond to a dispense rate of 4 GPM may be applied to the fuel system. It may be understood that by using the ELCM to increase pressure in the fuel system, the actual rate of fuel being dispensed into the fuel tank may not increase, but instead, the pressure mimics a desired fuel flow rate, such that vapor recirculation is encouraged in line with the desired fuel flow rate. In other words, if the actual rate comprises a first rate, then the actual rate of fuel being dispensed into the fuel tank may be maintained within a threshold (e.g. within 5%) of the first rate, while the ELCM is employed to increase pressure in the fuel system to a pressure corresponding to the desired rate, or a second rate.

Said another way, upon inferring that the fuel dispense rate is lower than the threshold dispense rate, the controller may determine what the pressure in the fuel system may be if the fuel flow rate was at the desired fuel flow rate (e.g. 10 GPM). This determination may be via a lookup table stored at the controller, for example. As per the example described above, a 2.2 InH2O pressure may correspond to a dispense rate of 10 GPM. Thus, the ELCM pump may be commanded to a speed that enables pressure in the fuel system to reach 2.2 InH2O. Accordingly, proceeding to 654, method 600 may include indicating whether the desired fuel tank pressure has been reached. If not, method 600 may return to step 651 where ELCM pump speed may continue to be controlled to allow pressure in the fuel system to reach the desired pressure. Upon reaching the desired pressure, method 600 may proceed to 657. At 657, method 600 may include indicating during the refueling event whether there are breakthrough emissions detected between the canister (e.g. 222) and atmosphere. For example, breakthrough emissions may comprise a concentration of hydrocarbons detected in the vent line (e.g. 227), for example via a hydrocarbon sensor (e.g. 272), that is in excess of a threshold hydrocarbon concentration. If breakthrough is detected, method 600 may proceed to 670, where mitigating action may be taken to route the breakthrough emissions back to the fuel tank, rather than allowing the breakthrough emissions to be routed to atmosphere, according to the method depicted at FIG. 7.

Turning now to FIG. 7, method 700 may begin at 705 and may include configuring V1 (e.g. 282) in an OFF configuration, thus fluidically coupling the ELCM to the vent line (e.g. 227) at the position between the CVV (e.g. 297) and the canister (e.g. 222). V2 (e.g. 284) and V3 (e.g. 286) may be maintained ON. Such a configuration is represented by the illustration depicted at FIG. 4. By configuration the vehicle system as such, fuel vapors emanating from the canister into the vent line may be pumped back to the fuel tank, as indicated by the bold arrows (e.g. 410) of FIG. 4.

Accordingly, proceeding to 710, method 700 may include controlling ELCM pump speed to a predetermined speed. As the ELCM pump speed was already being controlled in as per FIG. 6 (step 651) to increase pressure in the fuel system, the ELCM pump speed may be either maintained, or may be increased. In some examples, the ELCM pump speed may be decreased, but more likely, the ELCM pump speed may be increased. The CVV may be maintained open, or in other examples may be commanded closed. It may be understood that with the CVV maintained open, fuel vapors in the vent line may be drawn to the fuel tank, without further drawing fuel vapors from the canister into the vent line. If the CVV were closed, then the fuel vapors in the vent line may be drawn into the fuel and there may be some amount of fuel vapors drawn from the canister as well.

Proceeding to 715, method 700 may include monitoring hydrocarbon concentration in the vent line. At 720, responsive to the hydrocarbon concentration dropping below the threshold hydrocarbon concentration, method 700 may proceed to 725, where V1, V2, V3 and the ELCM pump may be commanded to the initial state they were in prior to beginning method 700. Thus, in this particular example, V1 may be commanded ON and ELCM pump speed may again be controlled such that the desired fuel tank pressure is reached, as discussed above. In other words, the system may be configured as per FIG. 3. Accordingly, method 700 may proceed to 730, where method 700 may include returning to the relevant step of FIG. 6. Accordingly, returning to step 670, in response to the mitigating action having been taken, method 600 may return to 657. In response to breakthrough emissions no longer being indicated, method 600 may proceed to 673. If, at 673, refueling is not indicated to be complete, method 600 may continue to monitor for breakthrough emissions. Alternatively, in response to an indication that refueling is complete, method 600 may proceed to 676. Specifically, refueling may be indicated to be complete in response to an automatic shutoff of the refueling dispenser when fuel level is at or near capacity of the tank, an operator removing the fuel dispenser from the fuel filler neck, closing/locking of a refueling door, replacement of a refueling cap, etc.

At 676, method 600 may include deactivating the ELCM pump, and may further include commanding OFF valves V1, V2, and V3. The ELCM COV may be commanded to the first position. In other words, the vehicle system may be configured as indicated at FIG. 2.

Proceeding to 679, method 600 may include updating vehicle operating conditions based on the refueling event. For example, fuel level may be updated, canister loading state may be updated, canister purge schedules may be updated to reflect the recent loading of the canister, etc. Method 600 may then end.

Thus, it may be understood that by controlling fuel system pressure via activation of the ELCM pump with V1, V2 and V3 valves being commanded ON (see FIG. 3), fuel vapor recirculation via the vapor recirculation line may be encouraged to mimic optimal fuel vapor recirculation even under conditions where a fuel dispense pump is underperforming. In this way, canister loading may be reduced. Furthermore, by activating the ELCM pump with V1, V2 and V3 valves being commanded ON at the first instant of an indication of fuel being added to the fuel tank, an initial pressure spike may be reduced or avoided, which may further reduce an amount of fuel vapors routed to the canister, and may prevent or reduce occurrences of premature shutoff events of the refueling dispenser.

Returning to 648, under conditions where it is determined that the fuel dispense rate is not less than the threshold dispense rate, method 600 may proceed to 682. At 682, method 600 may include deactivating the ELCM pump and configuring the COV in the first position, and may further include commanding OFF V1, V2 and V3 valves. The CVV may be maintained open.

Thus, in such an example, refueling may proceed without actively manipulating pressure in the fuel system to encourage fuel vapor recirculation via the vapor recirculation line (e.g. 231). Proceeding to 685, method 600 may include indicating whether breakthrough emissions are detected, as discussed above with regard to step 657 of method 600. If breakthrough emissions are detected, method 600 may proceed to 688, where mitigating action may be taken, as per the method of FIG. 7. Briefly, turning to FIG. 7, the method may include configuring V1, V2 and V3 on at 705, and may include commanding the ELCM COV to the second position and activating the ELCM pump to a predetermined speed at 710. At 715, hydrocarbon concentration may be monitored, and at 720, if hydrocarbon concentration is below the threshold hydrocarbon concentration, method 700 may proceed to 725 where V1, V2, V3 and the ELCM may be returned to the states they were in prior to step 705. In this case where the refueling event did not include actively manipulating fuel system pressure to encourage fuel vapor recirculation, V1, V2 and V3 may all be commanded OFF, the ELCM COV may be commanded to the first position and the ELCM pump may be deactivated. Proceeding to 730, method 700 may include proceeding to the relevant step of FIG. 6, in this case step 688.

At 688, responsive to the mitigating action having been taken to reduce the concentration of breakthrough emissions in the vent line, and in response to breakthrough emissions no longer being indicated at 685, method 600 may proceed to 691. At 691, it may be determined if the refueling event is complete, as discussed above with regard to step 673 of method 600. If not, the refueling event may continue, where breakthrough emissions may be continued to be monitored. Alternatively, if the refueling event is indicated to be complete, method 600 may proceed to 679. At 679, method 600 may include updating vehicle operating conditions. Specifically, method 600 may include updating fuel level in the fuel tank, updating a canister loading state to reflect the recent refueling event, updating a canister purging schedule based on the refueling event, etc. Method 600 may then end.

Turning now to FIG. 8, it continues from step 615 of method 600, in response to an indication that conditions are met for conducting an EVAP test diagnostic to ascertain a presence or an absence of undesired evaporative emissions stemming from the fuel system and/or evaporative emissions system.

Method 800 will be described with reference to the systems described herein and shown in FIGS. 1-5C, though it should be understood that similar methods may be applied to other systems without departing from the scope of this disclosure. Method 800 may be carried out by a controller, such as controller 212 in FIG. 2, and may be stored at the controller as executable instructions in non-transitory memory. Instructions for carrying out method 800 and the rest of the methods included herein may be executed by the controller based on instructions stored on a memory of the controller and in conjunction with signals received from sensors of the engine system, such as the sensors described above with reference to FIGS. 1-5C. The controller may employ actuators such as FTIV (e.g. 252), V1 (e.g. 282), V2 (e.g. 284), V3 (e.g. 286), CVV (e.g. 297), ELCM pump (e.g. 530), ELCM COV (e.g. 515) etc., to alter states of devices in the physical world according to the method depicted below.

Method 800 begins at 805 and includes commanding or maintaining OFF V1 (e.g. 282) and V2 (e.g. 284). In other words, step 805 may include commanding the ELCM fluidically coupled to the vent line as illustrated at FIG. 2. Furthermore, the CVV (e.g. 297) may be commanded closed.

Proceeding to 810, method 800 may include performing a reference check. As discussed above with regard to FIG. 5A, the ELCM reference check may include commanding or maintaining the ELCM COV (e.g. 515) to the first position, and activating the ELCM pump (e.g. 530). The ELCM pressure sensor (e.g. 296) may record the resulting vacuum level at the ELCM, after a predetermined amount of time, or when the vacuum level has reached a plateau The recorded vacuum level at the end of the reference check may be used as a threshold to signify the expected vacuum level attainable for a systemic source of undesired evaporative emissions having a diameter equivalent or greater to the reference orifice. In this example, the reference orifice has a diameter of 0.04", but may be smaller or greater in diameter in other examples.

Subsequent to conducting the reference check at 810, method 800 may proceed to 815. At 815, method 800 includes commanding open the FTIV (e.g. 252), and commanding or maintaining OFF V3 (e.g. 286). By commanding or maintaining OFF V3, it may be understood that V3 adopts an open configuration, enabling vacuum provided via the ELCM pump for the EVAP test diagnostic to reach the fuel filler system for diagnostic purposes. Furthermore, by commanding open the FTIV, the fuel system may be coupled to the evaporative emissions system to enable vacuum to be applied to the fuel system and evaporative emissions system for conducting the EVAP diagnostic.

Proceeding to 820, method 800 may include evacuating the fuel system and evaporative emissions system. Specifically, the ELCM COV may be commanded to the second position as depicted in FIG. 5B, and the ELCM pump (e.g. 530) may be activated to apply a vacuum (negative pressure with respect to atmospheric pressure) on the fuel system and evaporative emissions system. Proceeding to 825, method 800 may include indicating whether a threshold vacuum is reached in the fuel system and evaporative emissions system. The threshold vacuum may comprise the vacuum level attained during the reference check at step 810, for example. If the threshold vacuum has not been indicated to be reached, as monitored for example, via the FTPT (e.g. 291), method 800 may proceed to 830. At 830, method 800 may include indicating whether a predetermined duration of time has elapsed since initiating the activation of the ELCM pump. The predetermined duration may comprise an amount of time where it may be expected that the threshold vacuum would be reached if there were not a source of gross undesired evaporative emissions (e.g. greater than the diameter of the reference orifice utilized in conducting the reference check) stemming from the fuel system and/or evaporative emissions system. If, at 830, the predetermined duration has not elapsed, method 800 may return to 820 where the fuel system and evaporative emissions system may continue to be evacuated.

Alternatively, at 830, in response to the predetermined duration of time elapsing, method 800 may proceed to 835. At 835, method 800 may include indicating a presence of gross undesired evaporative emissions stemming from the fuel system and/or evaporative emissions system. In response to such an indication, method 800 may store the result at the controller, and may set a flag at the controller in the form of a diagnostic trouble code (DTC). Furthermore, a malfunction indicator light (MIL) may be illuminated at the vehicle dash, alerting a vehicle operator of a request to service the vehicle.

Proceeding to 840, method 800 may include deactivating the ELCM pump (e.g. 530) and commanding the ELCM COV (e.g. 515) to the first position (see FIG. 5C). The CVV may be commanded open, the FTIV may be commanded closed. Continuing to 850, method 800 may include updating vehicle operating conditions. For example, a canister purge schedule may be updated to reflect the source of gross undesired evaporative emissions. In one example, the canister purge schedule may be updated to purge the canister more frequently, to avoid release of undesired evaporative emissions to atmosphere. In some examples, updating vehicle operating conditions at 850 may include commanding the vehicle to operate in an electric-only mode of operation as frequently as possible, until it is indicated that the source of gross undesired evaporative emissions has been mitigated. In this way, less fuel vapor may be generated in the fuel system, which may reduce the potential for undesired evaporative emissions to escape to atmosphere. Method 800 may then end.

Returning to 825, in response to an indication that the threshold vacuum is reached at 825, method 800 may proceed to 855. At 855, method 800 may include deactivating the ELCM pump and sealing the fuel system and evaporative emissions system from atmosphere. Specifically, the ELCM COV may be maintained in the second position (see FIG. 5B) but with the ELCM pump commanded off. The CVV may be maintained closed.

Continuing to 860, method 800 may include monitoring pressure bleedup in the fuel system and evaporative emissions system for a predetermined duration of time. The predetermined duration of time may comprise an amount of time where, if there is not a source of undesired evaporative emissions (e.g. 0.02" or greater) stemming from the fuel system and evaporative emissions system, then it may be expected that the pressure in the fuel system and evaporative emissions system may remain below a pressure bleedup threshold.

Accordingly, proceeding to 865, method 800 may include indicating whether pressure in the fuel system and evaporative emissions system is less than the pressure bleedup threshold, and/or if a rate of pressure bleedup in the fuel system and evaporative emissions system is lower than a pressure bleedup threshold rate. If so, and in response to the predetermined duration elapsing, method 800 may proceed to 870. At 870, method 800 may include indicating an absence of undesired evaporative emissions stemming from the fuel system and/or evaporative emissions system. The result may be stored at the controller. Continuing to 875, method 800 may include commanding open the CVV, and may further include commanding closed the FTIV. The ELCM COV may be commanded to the first position.

Continuing to 880, method 800 may include updating vehicle operating conditions. For example, in response to an absence of undesired evaporative emissions, a canister loading state may be updated and a canister purge schedule correspondingly updated, as conducting the EVAP test may result in some fuel vapors being adsorbed at the canister. Method 800 may then end.

Returning to 865, in response to pressure bleedup in the fuel system and evaporative emissions system not remaining below the pressure bleedup threshold and/or in response to the rate of pressure bleedup not being less than the pressure bleedup threshold rate, method 800 may proceed to 885. At 885, method 800 may include indicating the presence of undesired evaporative emissions. It may be understood that the source of undesired evaporative emissions at 885 may comprise a source of non-gross undesired evaporative emissions, as gross undesired evaporative emissions are not indicated as per step 825 of method 800. Accordingly, the result may be stored at the controller, and a flag may be set at the controller in the form of a DTC, for example.

Continuing to 875, method 800 may include commanding open the CVV, and commanding closed the FTIV. The ELCM COV may be commanded to the first position. Proceeding to 880, method 800 may include updating vehicle operating conditions. For example, a canister loading state may be updated, and a canister purging schedule may be updated. As discussed above, in response to an indication of a source of undesired evaporative emissions, the canister may be purged more frequently, to avoid potential release of undesired evaporative emissions to atmosphere. Updating vehicle operating conditions may additionally or alternatively include commanding the vehicle to be propelled as frequently as possible using electric power, rather than relying on the engine. In this way, fuel vaporization may be reduced, thus reducing opportunity for release of undesired evaporative emissions to atmosphere. Method 800 may then end.

Thus, a method may comprise increasing a pressure in a fuel tank of a vehicle in response to an indication that a fuel dispenser providing a fuel to the fuel tank during a refueling event is dispensing the fuel at a first rate that is at least a threshold amount below a second rate, without changing the first rate at which the fuel dispenser is dispensing the fuel. Increasing the pressure in the fuel tank may further comprise increasing the pressure in the fuel tank to a pressure amount corresponding to an expected pressure when the fuel dispenser is dispensing the fuel at the second rate.

As one example of such a method, increasing the pressure in the fuel tank may result in less loading of a fuel vapor storage canister with fuel vapors, as compared to not increasing the pressure in response to the fuel dispenser dispensing the fuel at the first rate.

As another example of such a method, increasing the pressure in the fuel tank may be via a pump that is selectively fluidically coupled to a vapor recirculation line. The vapor recirculation line may be coupled to the fuel tank and to a fuel filler system of the fuel tank, where the function of the vapor recirculation line is to route a portion of fuel vapors generated during the refueling event back to the fuel tank. In such an example, increasing the pressure in the fuel tank may further comprise commanding closed a valve positioned in the vapor recirculation line between a restriction orifice and the fuel filler system of the fuel tank.

As yet another example of such a method, the method may further comprise increasing the pressure in the fuel tank prior to the indication that the fuel dispenser is dispensing fuel at the first rate in order to reduce or avoid a fuel tank pressure spike upon fuel being added to the fuel tank. In such an example, increasing the pressure prior to the indication that the fuel dispenser is dispensing fuel at the first rate may include increasing the pressure to a lower amount than when increasing the pressure in response to the indication that the fuel dispenser is dispensing fuel at the first rate.

As still another example of such a method, increasing the pressure in the fuel tank may further comprise commanding open or maintaining open a canister vent valve positioned in a vent line of an evaporative emissions system of the vehicle.

Another example of a method may comprise increasing a pressure in a fuel tank of a fuel system of a vehicle during a refueling event in response to an indication that a fuel dispenser that is dispensing fuel to the fuel tank is underperforming, by selectively fluidically coupling a pump to a vapor recirculation line that fluidically couples the fuel tank to a fuel filler system of the fuel system, and operating the pump to increase the pressure. In such an example, increasing the pressure in the fuel tank may encourage a greater amount of fuel vapor recirculation via the vapor recirculation line as compared to not increasing the pressure in the fuel tank in response to the indication that the fuel dispenser is underperforming.

As an example of such a method, the fuel dispenser underperforming may refer to the fuel dispenser dispensing the fuel at a rate that is lower than an optimal rate, the optimal rate a function of a sizing of a restriction orifice positioned in the vapor recirculation line.

As another example of such a method, selectively fluidically coupling the pump to the vapor recirculation line may include fluidically decoupling the pump from a vent line that fluidically couples a fuel vapor storage canister positioned in an evaporative emissions system to atmosphere. Such a method may further comprise commanding open or maintaining open a canister vent valve positioned in the vent line for increasing the pressure in the fuel tank. Such a method may further comprise selectively fluidically coupling the pump to both the vent line and to the vapor recirculation line in response to an indication of fuel vapors in the vent line above a threshold concentration during the refueling event, and operating the pump to return the fuel vapors in the vent line to the fuel tank. Such a method may further comprise, in the absence of the refueling event and further responsive to an indication that conditions are met for conducting an evaporative emissions test diagnostic procedure to indicate a presence or an absence of undesired evaporative emissions stemming from the fuel system and/or the evaporative emissions system, selectively fluidically coupling the pump to the vent line and not to the vapor recirculation line, and evacuating the fuel system and evaporative emissions system via the pump for conducting the evaporative emissions test diagnostic procedure. In such a method, increasing the pressure in the fuel tank may further comprise commanding closed a valve positioned in the vapor recirculation line between two points where the pump is selectively fluidically coupled to the vapor recirculation line.

Turning now to FIG. 9, an example timeline 900 is depicted, illustrating how fuel vapor recirculation may be encouraged in a vapor recirculation line (e.g. 231), in response to an indication that a fuel dispenser providing fuel to a fuel tank of a vehicle, is underperforming. In other words, in response to the fuel dispenser being inferred to be operating to dispense fuel at a rate that is lower than that expected or desired, fuel vapor recirculation through the vapor recirculation line may be encouraged, which may reduce loading of a fuel vapor storage canister (e.g. 222).

Timeline 900 includes plot 905, indicating whether a refueling event is requested (yes or no). Timeline 900 further includes plot 910, indicating pressure in a fuel system (e.g. 218), over time. Timeline 900 further includes plot 915, indicating whether the FTIV is open or closed, and plot 920, indicating whether the CVV is open or closed, over time. Timeline 900 further includes plot 925, indicating whether V1 (e.g. 282) is ON or OFF, plot 930, indicating whether V2 (e.g. 284) is ON or OFF, and plot 935, indicating whether V3 (e.g. 286) is ON or OFF, over time. For each of valves V1, V2, when the valves are OFF, it may be understood that the vent line (e.g. 227) is fluidically coupled to the ELCM as indicated at FIG. 2. Alternatively, for each of valves V1 and V2, when the valves are ON, it may be understood that the fuel vapor recirculation line (e.g. 231) is fluidically coupled to the ELCM as indicated at FIG. 3. For valve V3, it may be understood that when the valve is OFF, the valve is fully open, whereas when the valve is ON, the valve is fully closed.

Timeline 900 further includes plot 940, indicating a speed of the ELCM pump (e.g. 530). The pump may either be off, or it may be activated to increasing speeds (+), where increasing speed results in a greater vacuum/pressure provided via the pump, for example. Timeline 900 further includes plot 945, indicating a position of the ELCM COV (e.g. 515), over time. The ELCM COV may be either in a first position (see FIG. 5A and FIG. 5C), or may be in a second position (see FIG. 5B). Timeline 900 further includes plot 950, indicating a concentration of hydrocarbons (HC) present in the vent line (e.g. 227) as monitored by a HC sensor (e.g. 172), over time. The concentration may increase (+) or decrease (−), for example. Timeline 900 further includes plot 955, indicating a fuel level in the fuel tank (e.g. 144), over time. Fuel level may increase (+) or decrease (−) over time. Timeline 900 further includes plot 960, indicating a loading state of a fuel vapor canister (e.g. 222), over time. Loading state may be monitored, for example, via a temperature sensor (e.g. 232) coupled to the canister. Loading state may increase (+) or decrease (−), over time.

At time t0, a refueling event is received at the controller of the vehicle (plot 905). Fuel system pressure at time t0 is positive with respect to atmospheric pressure (plot 910). The FTIV is closed (plot 915), the CVV is open (plot 920), and each of V1 (plot 925), V2 (plot 930) and V3 (plot 935) are OFF. The ELCM pump is off (plot 940), and the ELCM COV is configured in the first position (plot 945). The HC sensor is not registering the presence of HCs in the vent line (plot 950), and fuel level in the fuel tank is low (plot 955). The canister is not saturated with fuel vapors (plot 960).

With refueling requested, at time t1 the FTIV is commanded open (plot 915). In this way, the fuel system is fluidically coupled to atmosphere. Accordingly, between time t1 and t2, pressure in the fuel system decays to atmospheric pressure (plot 910). At time t1, pressure in the fuel system starts to increase slightly, and in response, V1, V2 and V3 are all commanded ON (plots 925, 930 and 935, respectively), the ELCM COV is commanded to the second position (plot 945), and the ELCM pump is activated to a predetermined speed for a predetermined duration. By activating the ELCM pump at a first instance of an indication of fuel system pressure increasing, which corresponds to the addition of fuel to the fuel tank, an initial pressure spike that may otherwise occur (see dashed line 911), may be reduced or avoided (plot 910). In other words, by encouraging fuel vapor recirculation through the vapor recirculation line by configuring V1, V2 and V3 in the ON conformation, and by activating the ELCM pump at the predetermined speed, the initial pressure spike due to the addition of fuel to the tank may be reduced or avoided. Reducing or avoiding the initial pressure spike may serve to prevent premature shutoffs of the refueling dispenser, and/or may serve to reduce canister loading.

Between time t2 and t3, pressure in the fuel system is monitored, via for example the FTPT (e.g. 291). Based on the pressure in the fuel system, and taking into account an amount of pressure contributed by the ELCM pump being on, at time t3 it is indicated that the particular fuel dispenser that is providing fuel to the fuel tank, is underperforming. In other words, in this example timeline, fuel system pressure is lower than would be expected if the dispenser were dispensing fuel at a desired rate, or optimal rate given a size of the restriction orifice (e.g. 202) present in the vapor recirculation line (e.g. 231). The fuel system pressure corresponding to the desired rate is indicated by dashed line 912. Accordingly, if mitigating action is not taken to encourage fuel vapor recirculation through the vapor recirculation line, then the canister may be loaded to an increased amount above that which may occur is fuel vapor recirculation is active encouraged.

Thus, at time t3, the controller determines that the ELCM pump speed may be increased in order to achieve the desired fuel system pressure, corresponding to dashed line 912. Between time t3 and t4, the ELCM pump speed increases, and fuel system pressure increases as a result to the desired fuel system pressure. In this way, pressure in the fuel system mimics fuel system pressure that would occur if the fuel dispenser were dispensing fuel at the desired rate.

However, at time t4, the HC sensor positioned in the vent line indicates a concentration of HCs (plot 950) greater than a threshold HC concentration represented by dashed line 951. Because canister loading state is not saturated, the following scenario may have occurred. Specifically, the vehicle may have been parked in the sun, where some amount of fuel vapors may have migrated within the canister, to a position closer to the vent line. Thus, in response to the refueling event adding fuel vapors to the canister, the fuel vapors near the vent line may have been pushed into the vent line. Thus, at time t4, mitigating action is undertaken to reduce the amount of fuel vapors in the vent line.

Specifically, at time t4, V1 is turned OFF (plot 925), while V2 and V3 are maintained ON. In this way, the ELCM may fluidically couple the vent line to the vapor recirculation line, as depicted at FIG. 4. The ELCM may be maintained in operation (plot 940), and the CVV may be maintained open (plot 920), although the CVV may in some examples be commanded closed (represented by dashed line 921).

With the ELCM pump on, and with the vent line fluidically coupled to the ELCM, the ELCM further fluidically coupled to the vapor recirculation line, the concentration of fuel vapors in the vent line are reduced between time t4 and t5, and at time t5, the concentration is reduced to below the threshold HC concentration.

Accordingly, at time t6, V1 is returned to the ON configuration, thus again fluidically coupling the ELCM to the vapor recirculation line as depicted at FIG. 3. Between time t6 and t7, pressure in the fuel system is maintained at the desired pressure (plot 910 with reference to line 912). At time t7, pressure in the fuel system begins to spike, and between time t7 and t8, fuel system pressure reaches a maximum before declining to atmospheric pressure. It may be understood that the pressure spike between time t7 and t8 comprises an automatic shutoff of the refueling dispenser, caused by fuel in the fuel tank reaching a level where a FLVV (e.g. 285) closes, and thus the rapid pressure build in the fuel system serves to automatically induce shutoff of the refueling dispenser.

Accordingly, in response to the automatic shutoff of the refueling dispenser, the ELCM pump is deactivated (plot 940) between time t7 and t8. Furthermore, in response to the automatic shutoff of the refueling dispenser, fuel level in the fuel system stabilizes (plot 955), and canister loading state plateaus as well (plot 960). At time t8, refueling is no longer requested (plot 905), and thus the FTIV is commanded closed (plot 915), V1, V2 and V3 are all commanded OFF (plots 925, 930, and 935 respectively), and the ELCM COV is commanded to the first position (plot 945).

By encouraging fuel vapor recirculation via the vapor recirculation line in response to the indication that the fuel dispenser was underperforming, it may be understood that canister loading may be reduced as opposed to a case where no mitigating action were taken. This is graphically illustrated by comparison of dashed line 961 with plot 960. Dashed line 961 indicates canister loading state if mitigating action were not undertaken to encourage fuel vapor recirculation during the refueling event depicted at FIG. 9. Specifically, in the absence of mitigating action (dashed line 961), the canister would have been loaded to a degree greater than the actual canister loading state (plot 960). Such a greater loading may result in bleed through emissions, which may be avoided by taking the mitigating action discussed with regard to FIG. 9.

Turning now to FIG. 10, an example timeline 1000 depicting the conducting of an EVAP test diagnostic to ascertain a presence or an absence of undesired evaporative emissions stemming from a vehicle fuel system and/or evaporative emissions system, is shown. Timeline 1000 includes plot 1005, indicating whether conditions are met for conducting the EVAP test (yes or no). Timeline 1000 further includes plot 1010, indicating a status of an FTIV (open or closed), over time. Timeline 1000 further includes plot 1015, indicating a status of a CVV (open or closed), over time. Timeline 1000 further includes plots 1020, 1025, and 1030, indicating whether valves V1 (e.g. 282), V2 (e.g. 284) and V3 (e.g. 286), respectively, are ON or OFF, over time. For valves V1 and V2, it may be understood that when the valves are OFF, the ELCM (e.g. 295) is fluidically coupled to the vent line as depicted at FIG. 2.

Timeline 1000 further includes plot 1035, indicating whether an ELCM pump (e.g. 530) is on or off, over time. Timeline 1000 further includes plot 1040, indicating whether an ELCM COV (e.g. 515) is in a first position (see FIG. 5A and FIG. 5C), or in a second position (see FIG. 5B), over time. Timeline 1000 further includes plot 1045, indicating a fuel system and evaporative emissions system pressure, monitored for example via an FTPT (e.g. 291), over time. Timeline 1000 further includes plot 1050, indicating whether degradation is indicated (yes or no) in the fuel system and/or evaporative emissions system, degradation referring to a source of undesired evaporative emissions stemming from the fuel system and/or evaporative emissions system.

At time t0, conditions are not yet indicated to be met for conducting the EVAP test (plot 1005). The FTIV is closed (plot 1010), the CVV is open (plot 1015), each of valves V1, V2 and V3 (plots 1020, 1025, and 1030, respectively) are in the OFF state. Thus, the ELCM is fluidically coupled to the vent line, as depicted at FIG. 2. The ELCM pump is off (plot 1035), the ELCM COV is in the first position (plot 1040), and fuel system pressure is positive with respect to atmospheric pressure (Atm.) (plot 1045). Degradation of the fuel system and/or evaporative emission system is not yet indicated (plot 1050).

At time t1, conditions are indicated to be met for conducting the EVAP test, discussed above with regard to step 610 of method 600. Accordingly, at time t2, the FTIV is commanded open, thus fluidically coupling the fuel system to atmosphere. Accordingly, between time t2 and t3, pressure in the fuel system and evaporative emissions system decays to atmospheric pressure (plot 1045). While not explicitly illustrated, in response to pressure reaching atmospheric pressure, a reference check may be conducted, as per step 810 of method 800. In this example timeline, it may be understood that the reference check is conducted in response to fuel system pressure decaying to atmospheric pressure, but is not explicitly shown. However, the reference check establishes a threshold pressure which, if reached during evacuation of the fuel system and evaporative emissions system, may indicate an absence of gross undesired evaporative emissions. The threshold pressure is depicted as dashed line 1047.

Accordingly, at time t3 the CVV is commanded closed (plot 1015), and the ELCM COV is commanded to the second position. The ELCM pump is activated in a vacuum mode of operation, to communicate a negative pressure on the fuel system and/or evaporative emissions system.

Between time t3 and t4, pressure in the fuel system and evaporative emissions system is reduced, and at time t4, the threshold pressure is reached (plot 1045 with reference to dashed line 1047). With the threshold pressure reached at time t4, gross undesired evaporative emissions are not indicated.

At time t4, the ELCM pump is deactivated, thus sealing the fuel system and evaporative emissions system from atmosphere. Pressure in the fuel system and evaporative emissions system is monitored, and compared against a pressure bleedup threshold (referenced as dashed line 1048). Between time t4 and t5, pressure in the fuel system and evaporative emissions system remains below the pressure bleedup threshold (plot 1045 with reference to dashed line 1048), but at time t5 the pressure reaches the pressure bleedup threshold. Accordingly, degradation is indicated (plot 1050), the degradation corresponding to a source of non-gross undesired evaporative emissions stemming from the fuel system and/or evaporative emissions system. The result may be stored at the controller, a flag may be set at the controller in the form of a DTC, and a MIL may be illuminated at the vehicle dash, alerting the vehicle operator of a request to service the vehicle. With degradation indicated, conditions are no longer indicated to be met for conducting the EVAP test diagnostic.

At time t6, the ELCM COV is commanded to the first position (plot 1040), and the CVV is commanded open (plot 1015). In this way, pressure in the fuel system and evaporative emissions system is relieved (plot 1045). In response to pressure in the fuel system and evaporative emissions system reaching atmospheric pressure, the FTIV is commanded closed (plot 1010) at time t7. After time t7, the vehicle operating conditions are updated to reflect the indication of degradation stemming from the fuel system and/or evaporative emissions system, as discussed above.

In this way, in response to an indication that a fuel dispenser is dispensing fuel into a vehicle fuel tank at a rate lower than that expected or desired, or in other words, lower than an optimal rate, pressure in the fuel tank may be increased to a level which is consistent with fuel tank pressure that would be expected if the fuel dispenser were dispensing fuel at the desired rate. In doing so, fuel vapor recirculation via a vapor recirculation line may be improved, which may in turn reduce an amount of fuel vapors routed to a fuel vapor storage canister for such a refueling event. By reducing the amount of fuel vapors routed to the fuel vapor storage canister during such a refueling event where the fuel dispenser is underperforming, potential for bleedthrough emissions may be reduced or avoided.

The technical effect is to recognize that a pump (e.g. ELCM and incorporated pump) may be selectively fluidically coupled to the vapor recirculation line and fluidically decoupled from a vent line that couples a fuel vapor storage canister to atmosphere, in response to an indication that a fuel dispenser is underperforming during a refueling event. Thus, a technical effect is to recognize that a first valve and a second valve may be configured such that when the first valve and the second valve are in an OFF configuration where current is not being supplied to the valves, the pump may be fluidically coupled to the vent line, whereas when the first valve and the second valve are in an ON configuration where current is supplied to the valves, the pump may be fluidically coupled to the vapor recirculation line. A still further technical effect is to recognize that a third valve positioned in the vapor recirculation line between two points where the vapor recirculation line is fluidically coupled to the pump, may be commanded closed when the pump is employed to increase pressure in a fuel tank via the pump being selectively fluidically coupled to the vapor recirculation line. Yet another technical effect is to recognize that such a third valve may be commanded open when the pump is used to conduct evaporative emissions test diagnostics for a presence or an absence of undesired evaporative emissions stemming from a fuel system or an evaporative emissions system of the vehicle, where the pump is selectively fluidically coupled to the vent line for conducting such a test. Another technical effect is to recognize that a canister vent valve positioned in the vent line may be commanded open under conditions where the pump is employed to increase pressure in the fuel tank during refueling events where it is indicated that a fuel dispenser is underperforming. Finally, yet another technical effect is to recognize that under certain conditions where a concentration of fuel vapors in a vent line, as monitored via for example a hydrocarbon sensor, is greater than a threshold concentration, the first valve may be commanded to the OFF state, the second valve may be commanded to the ON state, and the third valve may be commanded closed. In this way, the pump may be operated to return fuel vapors in the vent line back to the fuel tank, which may reduce release of undesired evaporative emissions to the environment.

The systems described above and with regard to FIGS. 1-5C, along with the methods described above and with regard to FIGS. 6-8, may enable one or more systems and one or more methods. In one example, a method comprises increasing a pressure in a fuel tank of a vehicle in response to an indication that a fuel dispenser providing a fuel to the fuel tank during a refueling event is dispensing the fuel at a first rate that is at least a threshold amount below a second rate, without changing the first rate at which the fuel dispenser is dispensing the fuel. In a first example of the method, the method further includes wherein increasing the pressure in the fuel tank further comprises increasing the pressure in the fuel tank to a pressure amount corresponding to an expected pressure when the fuel dispenser is dispensing the fuel at the second rate. A second example of the method optionally includes the first example, and further includes wherein increasing the pressure in the fuel tank results in less loading of a fuel vapor storage canister with fuel vapors, as compared to not increasing the pressure in response to the fuel dispenser dispensing the fuel at the first rate. A third example of the method optionally includes any one or more of the first through second examples, and further includes wherein increasing the pressure in the fuel tank is via a pump that is selectively fluidically coupled to a vapor recirculation line, the vapor recirculation line coupled to the fuel tank and to a fuel filler system of the fuel tank, where the function of the vapor recirculation line is to route a portion of fuel vapors generated during the refueling event back to the fuel tank. A fourth example of the method optionally includes any one or more or each of the first through third examples, and further includes wherein increasing the pressure in the fuel tank further comprises commanding closed a valve positioned in the vapor recirculation line between a restriction orifice and the fuel filler system of the fuel tank. A fifth example of the method optionally includes any one or more or each of the first through fourth examples, and further comprises increasing the pressure in the fuel tank prior to the indication that the fuel dispenser is dispensing fuel at the first rate in order to reduce or avoid a fuel tank pressure spike upon fuel being added to the fuel tank. A sixth example of the method optionally includes any one or more or each of the first through fifth examples, and further includes wherein increasing the pressure prior to the indication that the fuel dispenser is dispensing fuel at the first rate includes increasing the pressure to a lower amount than when increasing the pressure in response to the indication that the fuel dispenser is dispensing fuel at the first rate. A seventh example of the method optionally includes any one or more or each of the first through sixth examples, and further includes wherein increasing the pressure in the fuel tank further comprises commanding open or maintaining open a canister vent valve positioned in a vent line of an evaporative emissions system of the vehicle.

Another example of a method comprises increasing a pressure in a fuel tank of a fuel system of a vehicle during a refueling event in response to an indication that a fuel dispenser that is dispensing fuel to the fuel tank is underperforming, by selectively fluidically coupling a pump to a vapor recirculation line that fluidically couples the fuel tank to a fuel filler system of the fuel system; and operating the pump to increase the pressure. In a first example of the method, the method may further include wherein increasing the pressure in the fuel tank encourages a greater amount of fuel vapor recirculation via the vapor recirculation line as compared to not increasing the pressure in the fuel tank in response to the indication that the fuel dispenser is underperforming. A second example of the method optionally includes the first example, and further includes wherein the fuel dispenser underperforming refers to the fuel dispenser dispensing the fuel at a rate that is lower than an optimal rate, the optimal rate a function of a sizing of a restriction orifice positioned in the vapor recirculation line. A third example of the method optionally includes any one or more or each of the first through second examples, and further includes wherein selectively fluidically coupling the pump to the vapor recirculation line includes fluidically decoupling the pump from a vent line that fluidically couples a fuel vapor storage canister positioned in an evaporative emissions system to atmosphere. A fourth example of the method optionally includes any one or more or each of the first through third examples, and further comprises commanding open or maintaining open a canister vent valve positioned in the vent line for increasing the pressure in the fuel tank. A fifth example of the method optionally includes any one or more or each of the first through fourth examples, and further comprises selectively fluidically coupling the pump to both the vent line and to the vapor recirculation line in response to an indication of fuel vapors in the vent line above a threshold concentration during the refueling event; and operating the pump to return the fuel vapors in the vent line to the fuel tank. A sixth example of the method optionally includes any one or more or each of the first through fifth examples, and further comprises in the absence of the refueling event and further responsive to an indication that conditions are met for conducting an evaporative emissions test diagnostic procedure to indicate a presence or an absence of undesired evaporative emissions stemming from the fuel system and/or the evaporative emissions system, selectively fluidically coupling the pump to the vent line and not to the vapor recirculation line; and evacuating the fuel system and evaporative emissions system via the pump for conducting the evaporative emissions test diagnostic procedure. A seventh example of the method optionally includes any one or more or each of the first through sixth examples, and further includes wherein increasing the pressure in the fuel tank further comprises commanding closed a valve positioned in the vapor recirculation line between two points where the pump is selectively fluidically coupled to the vapor recirculation line.

An example of a system for a vehicle comprises a pump that is selectively fluidically coupled to a vent line stemming from a fuel vapor storage canister in an evaporative emissions system when a first valve and a second valve are in an OFF state, and that is selectively fluidically coupled to a vapor recirculation line that couples a fuel tank to a fuel filler system when the first valve and the second valve are in an ON state; and a controller with computer readable instructions stored on non-transitory memory that when executed during a refueling event of the fuel tank, cause the controller to: indicate a fuel dispenser that is dispensing fuel to the fuel tank is dispensing fuel at a rate lower than a desired rate; command the first valve and the second valve to the ON state to selectively fluidically couple the pump to the vapor recirculation line; and operate the pump to increase a pressure in the fuel tank to a pressure level that is expected in response to the fuel dispenser dispensing fuel at the desired rate. In a first example of the system, the system further comprises a restriction orifice positioned in the vapor recirculation line, where the desired rate is a function of a sizing of the restriction orifice; a third valve positioned in the vapor recirculation line between the restriction orifice and the fuel filler system, and further between two points where the pump is selectively fluidically coupled to the vapor recirculation line; and wherein the controller stores further instructions to command closed the third valve for increasing the pressure in the fuel tank. A second example of the system optionally includes the first example, and further includes wherein the controller stores further instructions to, in response to an indication that the refueling event is not requested and further responsive to an indication that conditions are met for conducting an evaporative emissions test diagnostic to determine a presence or an absence of degradation stemming from a fuel system that includes the fuel tank and/or the evaporative emissions system, command the first valve and the second valve to the OFF state; command the third valve open; and operate the pump to evacuate the fuel system and the evaporative emissions system in order to conduct the evaporative emissions test diagnostic. A third example of the system optionally includes any one or more or each of the first through second examples, and further comprises a hydrocarbon sensor positioned in the vent line; and wherein the controller stores further instructions to, in response to an indication of a concentration of hydrocarbons in the vent line greater than a threshold concentration: command the first valve to the OFF state, command the second valve to the ON state and command the third valve to the closed state; and operate the pump to route the hydrocarbons in the vent line back to the fuel tank until the concentration of hydrocarbons in the vent line is lower than the threshold concentration.

In another example, a method comprises, in response to an indication of bleedthrough of fuel vapors from a fuel vapor storage canister positioned in an evaporative emissions system, selectively coupling a pump to a vent line stemming from the fuel vapor storage canister and to a vapor recirculation line that couples a fuel tank of a fuel system to a fuel filler system of the fuel system, and operating the pump to route the fuel vapors to the fuel tank. In such a method, the indication of bleedthrough of the fuel vapors may be via a hydrocarbon sensor positioned in the vent line. In such a method, the indication may be during a refueling event where fuel is being added to the fuel tank. In another example, the indication may be during a vehicle-off condition where breakthrough of the fuel vapors triggers a wakeup of the controller in order to route the fuel vapors to the fuel tank to prevent the bleedthrough emissions from being released to atmosphere. In another example, the indication may be during vehicle operation with an engine off such as may occur at a start/stop event in a hybrid vehicle. In another example, the indication may be during vehicle operation with the engine off, where the vehicle is being electrically propelled.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
increasing a pressure in a fuel tank of a vehicle in response to an indication that a fuel dispenser providing a fuel to the fuel tank during a refueling event is dispensing the fuel at a first rate that is at least a threshold amount below a second rate, without changing the first rate at which the fuel dispenser is dispensing the fuel; and
increasing the pressure in the fuel tank prior to the indication that the fuel dispenser is dispensing the fuel at the first rate in order to reduce or avoid a fuel tank pressure spike upon the fuel being added to the fuel tank.

2. The method of claim 1, wherein increasing the pressure in the fuel tank further comprises increasing the pressure in the fuel tank to a pressure amount corresponding to an expected pressure when the fuel dispenser is dispensing the fuel at the second rate.

3. The method of claim 1, wherein increasing the pressure in the fuel tank results in less loading of a fuel vapor storage canister with fuel vapors, as compared to not increasing the pressure in response to the fuel dispenser dispensing the fuel at the first rate.

4. The method of claim 1, wherein increasing the pressure prior to the indication that the fuel dispenser is dispensing the fuel at the first rate includes increasing the pressure to a lower amount than when increasing the pressure in response to the indication that the fuel dispenser is dispensing the fuel at the first rate.

5. The method of claim 1, wherein increasing the pressure in the fuel tank further comprises commanding open or maintaining open a canister vent valve positioned in a vent line of an evaporative emissions system of the vehicle.

6. A method, comprising:

increasing a pressure in a fuel tank of a vehicle in response to an indication that a fuel dispenser providing a fuel to the fuel tank during a refueling event is dispensing the fuel at a first rate that is at least a threshold amount below a second rate, without changing the first rate at which the fuel dispenser is dispensing the fuel, wherein increasing the pressure in the fuel tank is via a pump that is selectively fluidically coupled to a vapor recirculation line, the vapor recirculation line coupled to the fuel tank and to a fuel filler system of the fuel tank, and wherein the function of the vapor recirculation line is to route a portion of fuel vapors generated during the refueling event back to the fuel tank.

7. The method of claim 6, wherein increasing the pressure in the fuel tank further comprises commanding closed a valve positioned in the vapor recirculation line between a restriction orifice and the fuel filler system of the fuel tank.

8. A method, comprising:

increasing a pressure in a fuel tank of a fuel system of a vehicle during a refueling event in response to an indication that a fuel dispenser that is dispensing fuel to the fuel tank is underperforming, by selectively fluidically coupling a pump to a vapor recirculation line that fluidically couples the fuel tank to a fuel filler system of the fuel system; and operating the pump to increase the pressure.

9. The method of claim 8, wherein increasing the pressure in the fuel tank encourages a greater amount of fuel vapor recirculation via the vapor recirculation line as compared to not increasing the pressure in the fuel tank in response to the indication that the fuel dispenser is underperforming.

10. The method of claim 8, wherein the fuel dispenser underperforming refers to the fuel dispenser dispensing the fuel at a rate that is lower than an optimal rate, the optimal rate a function of a sizing of a restriction orifice positioned in the vapor recirculation line.

11. The method of claim 8, wherein selectively fluidically coupling the pump to the vapor recirculation line includes fluidically decoupling the pump from a vent line that fluidically couples a fuel vapor storage canister positioned in an evaporative emissions system to atmosphere.

12. The method of claim 11, further comprising commanding open or maintaining open a canister vent valve positioned in the vent line for increasing the pressure in the fuel tank.

13. The method of claim 11, further comprising selectively fluidically coupling the pump to both the vent line and to the vapor recirculation line in response to an indication of fuel vapors in the vent line above a threshold concentration during the refueling event; and operating the pump to return the fuel vapors in the vent line to the fuel tank.

14. The method of claim 11, further comprising in an absence of the refueling event and further responsive to an indication that conditions are met for conducting an evaporative emissions test diagnostic procedure to indicate a presence or an absence of undesired evaporative emissions stemming from the fuel system and/or the evaporative emissions system, selectively fluidically coupling the pump to the vent line and not to the vapor recirculation line; and evacuating the fuel system and the evaporative emissions system via the pump for conducting the evaporative emissions test diagnostic procedure.

15. The method of claim 11, wherein increasing the pressure in the fuel tank further comprises commanding closed a valve positioned in the vapor recirculation line between two points where the pump is selectively fluidically coupled to the vapor recirculation line.

* * * * *